US 11,455,672 B2

(12) United States Patent
Cockcroft et al.

(10) Patent No.: US 11,455,672 B2
(45) Date of Patent: Sep. 27, 2022

(54) SYSTEMS AND METHODS TO ADAPT SEARCH RESULTS

(71) Applicant: eBay Inc., San Jose, CA (US)

(72) Inventors: Oliver Nicholas Cockcroft, Los Gatos, CA (US); Jack P. Pattishall, Jr., San Jose, CA (US)

(73) Assignee: eBay Inc., San Jose, CA (US)

(*) Notice: Subject to any disclaimer, the term of this patent is extended or adjusted under 35 U.S.C. 154(b) by 73 days.

(21) Appl. No.: 16/804,844

(22) Filed: Feb. 28, 2020

(65) Prior Publication Data

US 2020/0202407 A1   Jun. 25, 2020

Related U.S. Application Data

(63) Continuation of application No. 14/095,594, filed on Dec. 3, 2013, now abandoned.

(51) Int. Cl.
*G06Q 30/06* (2012.01)
*G06F 16/951* (2019.01)
(Continued)

(52) U.S. Cl.
CPC ....... *G06Q 30/0623* (2013.01); *G06F 16/951* (2019.01); *H04L 67/02* (2013.01); *H04L 67/2823* (2013.01)

(58) Field of Classification Search
CPC ............ G06Q 30/0623; G06F 16/951; H04L 67/2823
See application file for complete search history.

(56) References Cited

U.S. PATENT DOCUMENTS 7,080,073 B1   7/2006   Jiang et al.
7,593,928 B2   9/2009   Canon et al.
(Continued)

FOREIGN PATENT DOCUMENTS

CN   101802773 A   8/2010
CN   102298615 A   12/2011
(Continued)

OTHER PUBLICATIONS

Office Action received for Canadian Patent Application No. 2,932,113, dated Jan. 7, 2021, 6 Pages.
(Continued)

*Primary Examiner* — Mariela Reyes
*Assistant Examiner* — Courtney Harmon
(74) *Attorney, Agent, or Firm* — Shook, Hardy & Bacon L.L.P.

(57) ABSTRACT

Methods and systems to adapt search results are described. The system receives search information that includes a constraint over a network. The system generates a first search result based on the search information. The system communicates a first user interface, over the network, to the client device. The first user interface is formatted based on first formatting level information. The system receives a first request, over the network, from the client device. The first request includes a description of a first interaction with the first search result. The system identifies a first formatting level based on at least one interaction that was received previous to receiving the first request. The system transitions to a second formatting level based on the first formatting level and the first interaction. The second formatting level is associated with second formatting level information.

20 Claims, 22 Drawing Sheets

(51) Int. Cl.
*H04L 67/565* (2022.01)
*H04L 67/02* (2022.01)

(56) References Cited

U.S. PATENT DOCUMENTS

| | | | |
|---|---|---|---|
| 7,668,811 B2 | 2/2010 | Janssens et al. | |
| 7,720,882 B2 | 5/2010 | Liu et al. | |
| 7,765,227 B1* | 7/2010 | Khoshnevisan | G06F 16/9535 707/769 |
| 8,386,321 B2 | 2/2013 | Grant et al. | |
| 8,452,793 B2 | 5/2013 | Anick et al. | |
| 8,473,855 B2 | 6/2013 | Hogan et al. | |
| 9,703,871 B1* | 7/2017 | Das | G06F 16/3338 |
| 2005/0223024 A1 | 10/2005 | Hyun et al. | |
| 2005/0223025 A1 | 10/2005 | Bennett | |
| 2008/0052623 A1 | 2/2008 | Gutfleisch | |
| 2008/0183596 A1* | 7/2008 | Nash | G06F 16/90335 707/999.005 |
| 2008/0223024 A1 | 9/2008 | Kammler et al. | |
| 2010/0318551 A1* | 12/2010 | Lai | G06F 16/9535 707/765 |
| 2011/0093488 A1 | 4/2011 | Amacker et al. | |
| 2011/0320424 A1 | 12/2011 | Zias et al. | |
| 2012/0150657 A1 | 6/2012 | Rubinstein et al. | |
| 2012/0173373 A1* | 7/2012 | Soroca | H04W 4/02 705/26.3 |
| 2012/0290977 A1 | 11/2012 | Devecka | |
| 2013/0031506 A1 | 1/2013 | Diaz et al. | |
| 2013/0275164 A1 | 10/2013 | Gruber et al. | |
| 2013/0282753 A1 | 10/2013 | Sugimoto | |
| 2014/0040715 A1 | 2/2014 | Younge et al. | |
| 2014/0379696 A1 | 12/2014 | Gyongyi et al. | |
| 2015/0154251 A1 | 6/2015 | Cockcroft et al. | |

FOREIGN PATENT DOCUMENTS

| | | |
|---|---|---|
| CN | 105917331 A | 8/2016 |
| WO | 2015/084877 A1 | 6/2015 |

OTHER PUBLICATIONS

Korean Office Action received for Korean Patent Application No. 10-2016-7017779, dated Apr. 28, 2017, 5 pages with English translation.
Office Action received for Korean Patent Application No. 10-2016-7017779, dated Nov. 29, 2017, 11 pages (5 pages of English Translation and 6 pages of official copy).
Response to Office Action filed on Jan. 29, 2018, for Korean Patent Application No. 10-2016-7017779, dated Nov. 29, 2017, 36 pages (30 pages of Official Copy and 6 pages of English Claims).
Response to Office Action filed on Jun. 28, 2017, for Korean Patent Application No. 10-2016-7017779, dated Apr. 28, 2017, 23 pages (19 pages of official copy and 4 pages of English pending claims).
International Search Report received for PCT Patent Application No. PCT/US2014/068216, dated Mar. 3, 2015, 2 pages.
International Report on Patentability received for PCT Application No. PCT/US2014/068216, dated Jun. 16, 2016, 10 pages.
International Written Opinion received for PCT Patent Application No. PCT/US2014/068216, dated Mar. 3, 2015, 8 pages.
Response to Office Action filed on Mar. 21, 2 019, for Chinese Patent Application No. 201480073344.3, dated Nov. 6, 2018, 15 pages (11 pages of official copy and 4 pages of English translation).
Office Action Received for Chinese Patent Application No. 201480073344.3, dated Nov. 6, 2018, 16 pages (9 pages English Translation and 7 official copy only).
Office Action received for Canadian patent Application No. 2,932,113, dated Jan. 29, 2019, 6 pages.
Response to First Examination Report filed on Apr. 12, 2017, for Australian Patent Application No. 2014360698, dated Nov. 21, 2016, 27 pages.
First Examiner Report received for Australian Application No. 2014360698, dated Nov. 21, 2016, 3 pages.
Response to Office Action filed on Jun. 21, 2019, for Canadian Patent Application No. 2,932,113 , dated Jan. 29, 2019, 20 pages.
Response to Office Action filed on Aug. 25, 2017, for Canadian Patent Application No. 2,932,113, dated Mar. 3, 2017, 6 pages.
Response to Office Action filed on Aug. 21, 2018, for Canadian Patent Application No. 2,932,113, dated Feb. 27, 2018, 16 pages.
Office Action received for Canadian Patent Application No. 2,932,113, dated Feb. 27, 2018, 5 pages.
First Office Action received for Canadian Patent Application No. 2,932,113, dated Mar. 3, 2017, 4 pages.
Response to Rule 70(2) and 70a(2) filed on Jun. 19, 2017, for European Patent Application No. 14868617.3, on Dec. 23, 2016, 16 pages.
Response to Communication Pursuant to Article 94(3) EPC filed on Sep. 16, 2019, for European Patent Application No. 14868617.3, dated May 8, 2019, 10 pages.
Extended European Search Report received for European Patent Application No. 14868617.3, dated Dec. 36, 2016, 6 pages.
Communication Pursuant to Article 94(3) EPC received for European Patent Application No. 14868617.3, dated May 8, 2019, 10 pages.
Amendments filed in European Patent Application No. 14868617.3, dated Aug. 11, 2016, 11 pages.
International Written Opinion received for PCT Patent Application No. PCT/US2014/068216, dated Mar. 3, 2015, Mar. 3, 2015, 8 pages.
Advisory Action received for U.S. Appl. No. 14/095,594, dated Mar. 19, 2018, 7 pages.
Advisory Action received for U.S. Appl. No. 14/095,594, dated May 19, 2017, 4 pages.
Applicant Initiated Interview Summary received for U.S. Appl. No. 14/095,594, dated Dec. 31, 2019, 3 pages.
Applicant Initiated Interview Summary received for U.S. Appl. No. 14/095,594, dated Nov. 26, 2018, 3 pages.
Applicant Interview Summary received for U.S. Appl. No. 14/095,594, dated Feb. 22, 2016, 3 pages.
Applicant Interview Summary received for U.S. Appl. No. 14/095,594, dated Jun. 14, 2016, 3 pages.
Final Office Action received for U.S. Appl. No. 14/095,594, dated Dec. 26, 2017, 34 pages.
Final Office Action received for U.S. Appl. No. 14/095,594, dated Mar. 9, 2017, 27 pages.
Final Office Action received for U.S. Appl. No. 14/095,594, dated Mar. 30, 2016, 25 pages.
Final Office Action received for U.S. Appl. No. 14/095,594, dated Oct. 18, 2018, 28 pages.
Final Office Action received for U.S. Appl. No. 14/095,594, dated Oct. 29, 2019, 25 pages.
Non-Final Office Action received for U.S. Appl. No. 14/095,594, dated Aug. 18, 2017, 28 pages.
Non-Final Office Action received for U.S. Appl. No. 14/095,594, dated Dec. 1, 2015, 2015, 23 pages.
Non-Final Office Action received for U.S. Appl. No. 14/095,594, dated Jun. 21, 2019, 26 pages.
Non-Final Office Action received for U.S. Appl. No. 14/095,594, dated May 3, 2018, 28 pages.
Office Action received for Canadian Patent Application No. 2,932,113, dated Feb. 19, 2020, 7 pages.
Non-Final Office Action received for U.S. Appl. No. 14/095,594, dated Sep. 27, 2016, 21 pages.
Response to Advisory Action filed on Jun. 16, 2017, for U.S. Appl. No. 14/095,594, dated May 19, 2017, 13 pages.
Response to Final Office Action filed on Apr. 18, 2019, for U.S. Appl. No. 14/095,594, dated Oct. 18, 2018, 18 pages.
Response to Final Office Action filed on Aug. 1, 2016, for U.S. Appl. No. 14/095,594, dated Mar. 30, 2016, 12 pages.
Response to Final Office Action filed on Feb. 26, 2018, for U.S. Appl. No. 14/095,594, dated Dec. 26, 2017, 15 pages.
Response to Final Office Action filed on May 9, 2017, for U.S. Appl. No. 14/095,594, dated Mar. 9, 2017, 12 pages.

(56) References Cited

OTHER PUBLICATIONS

Response to Non Final Office Action filed on Feb. 22, 2016, for U.S. Appl. No. 14/095,594, dated Dec. 1, 2015, 12 pages.
Response to Non-Final Office Action filed on Aug. 2, 2018, for U.S. Appl. No. 14/095,594, dated May 3, 2018, 16 pages.
Response to Non-Final Office Action filed on Jan. 27, 2017, for U.S. Appl. No. 14/095,594, dated Sep. 27, 2016, 12 pages.
Response to Non-Final Office Action filed on Nov. 20, 2017, for U.S. Appl. No. 14/095,594, dated Aug. 18, 2017, 16 pages.
Response to Non-Final Office Action filed on Sep. 20, 2019, for U.S. Appl. No. 14/095,594, dated Jun. 21, 2019, 16 pages.
Summons to Attend Oral Proceedings for European Patent Application No. 14868617.3, dated May 6, 2020, 10 pages.
Response to Office Action filed on Jun. 19, 2020, for Canadian Patent Application No. 2,932,113, dated Feb. 19, 2020, 9 pages.
Office Action received for Canadian Patent Application No. 2,932,113 dated Feb. 16, 2022, 8 Pages.

* cited by examiner

*FIG.5A*
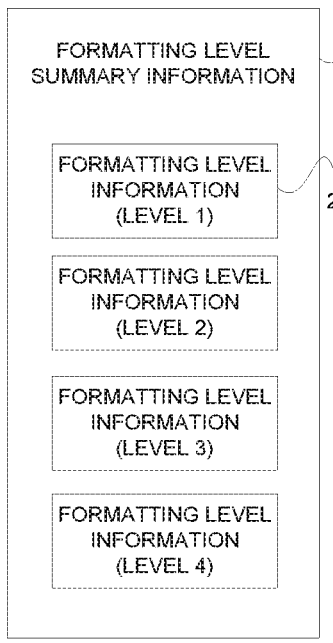
*FIG.5B*
*FIG.5C*
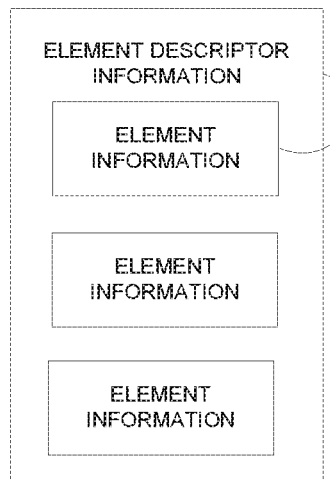
*FIG.5D*
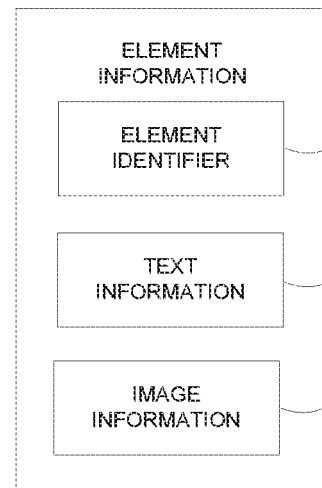

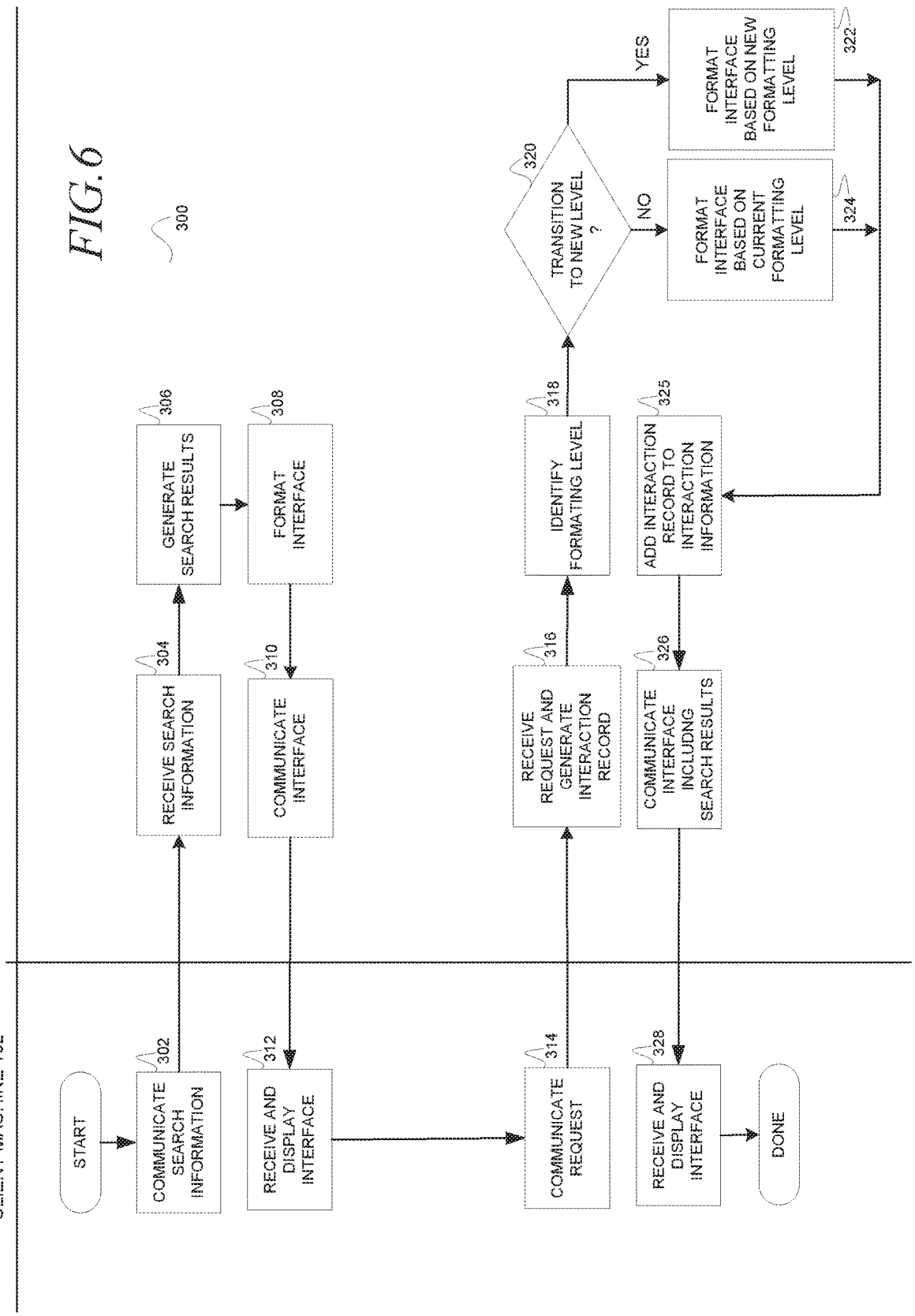

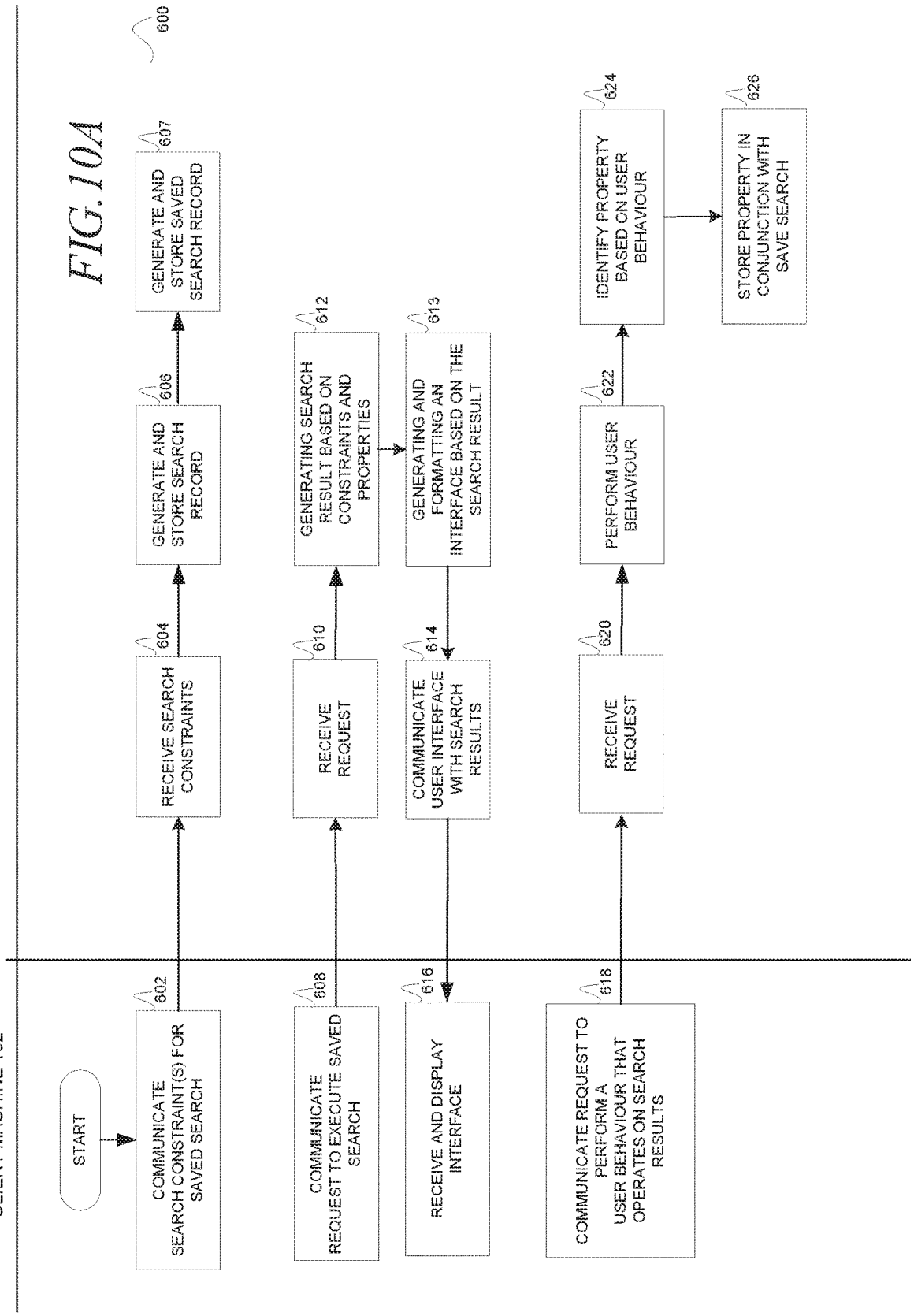

SYSTEMS AND METHODS TO ADAPT SEARCH RESULTS

CROSS-REFERENCE TO RELATED APPLICATIONS

This patent application is a continuation of U.S. patent application Ser. No. 14/095,594, filed Dec. 3, 2013, which is incorporated herein by reference in its entirety.

TECHNICAL FIELD

This disclosure relates to systems and methods supporting computing and data processing systems. More particularly, systems and methods to adapt search results are described.

RELATED ART

The Internet has become an indispensable tool to modern society. Web sites are ubiquitous and offer a plethora of web content. Web content may be presented in a manner that is not responsive user interactions.

BRIEF DESCRIPTION OF THE DRAWINGS

Embodiments are illustrated by way of example and not limitation in the figures of the accompanying drawings, in which:

FIG. 5A is a block diagram illustrating formatting level summary information, according to an embodiment;

FIG. 5B is a block diagram illustrating formatting level information, according to an embodiment;

FIG. 5C is a block diagram illustrating element descriptor information, according to an embodiment;

FIG. 5D is a block diagram illustrating element information, according to an embodiment;

FIG. 6 is a block diagram illustrating a method, according to an embodiment, to adapt search results based on user interactions;

FIG. 10A is a flow chart illustrating a method, according to an embodiment, to adapt a search result based on a saved search;

DETAILED DESCRIPTION

Figure 1:
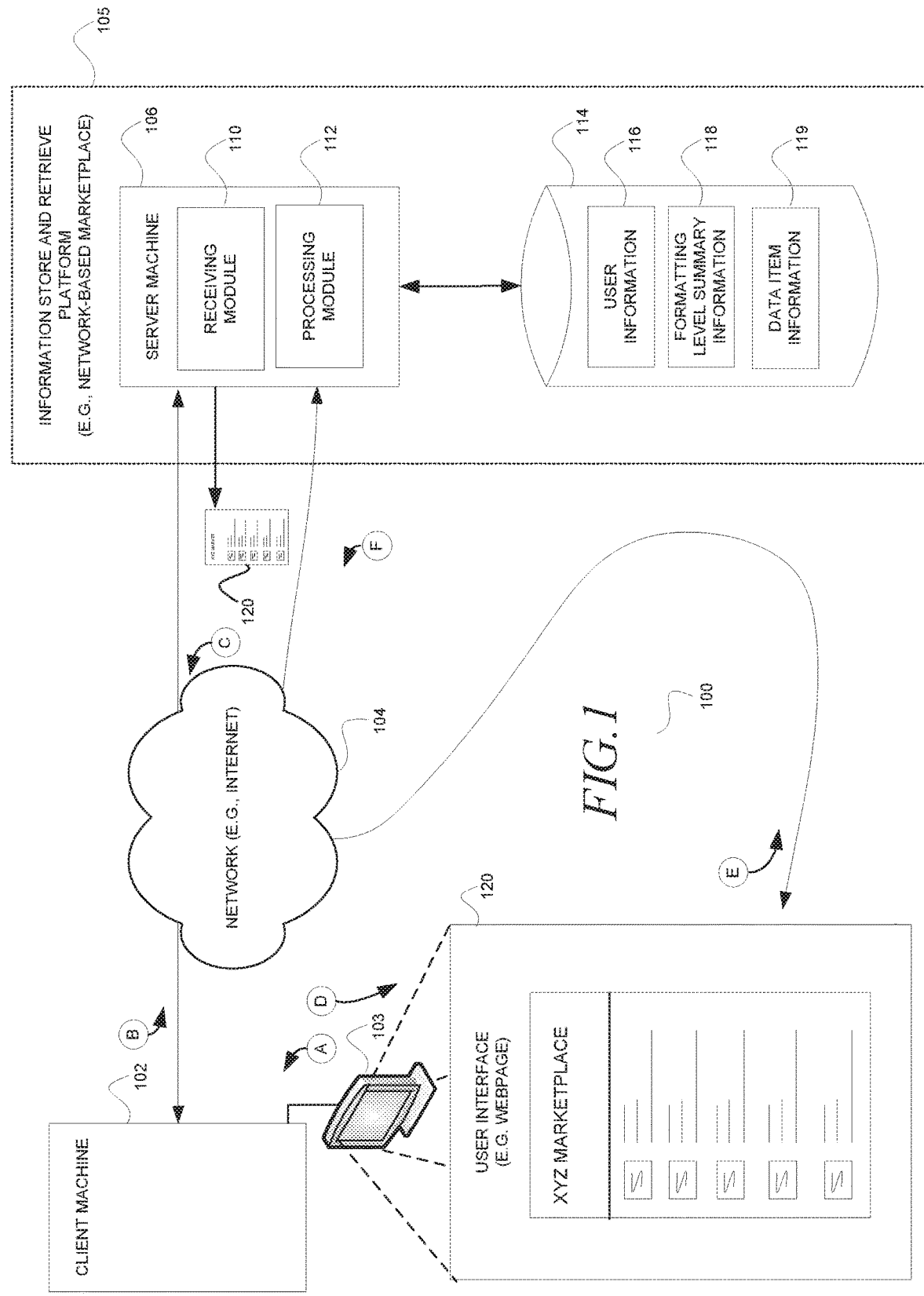
FIG. 1 is a block diagram illustrating a system, according to an embodiment, to adapt search results based on user interactions.

In the following description, for purposes of explanation, numerous specific details are set forth in order to provide a thorough understanding of some example embodiments. It will be evident, however, to one of ordinary skill in the art, that embodiments of the present disclosure may be practiced without these specific details.

As described further below, according to various example embodiments of the disclosed subject matter described and claimed herein, there are provided systems and methods to adapt search results. Various embodiments are described below in connection with the figures provided herein.

According to a first aspect of the disclosure methods and systems for adapting search results based on user interactions are described. The system may include a receiving module that is configured to receive search information, over a network, from a client device (e.g., mobile device, desktop computer, tablet, etc.). The search information may include one or more constraints (e.g., keywords). The system may further include a processing module that generates a first search result based on the search information that includes data items. Merely for example, the data items may include listings that describe items or services that are for sale on a network-based marketplace such as eBay®—The Worlds Online Marketplace, of San Jose, Calif. The processing module is further configured to communicate a first user interface, over the network, to the client device, the first user interface being formatted based on first formatting level information. The receiving module is further configured to receive a first request, over the network, from the client device, the first request including a description of a first interaction with the first search result. Merely for example, the first interaction may include a page-down, or a scroll-down towards the bottom of the search results (e.g., 80% of search results), or a swipe-down with a vigorous motion that is associated with five pages of search results (e.g., 50% of search results). The processing module is further configured to identify a first formatting level based on interactions that were received previous to the receipt of the first request. For example, the previous interactions may be scored, summed, and associated with the first formatting level. The processing module is further configured to transition to a second formatting level based on the first formatting level and the first interaction. The processing module is further configured to associate the second formatting level with second formatting level information that is utilized to format the second user interfaces and to communicate the second user interface, over the network, to the client device.

According to a second aspect of the disclosure methods and systems for adapting a search result based on a saved search are described. The system may include a communication module that is configured to receive a request to execute a saved search from a client machine (e.g., mobile device, desktop computer, tablet, etc.). The system may further include a saved search module that associates the identified saved search with search constraints including keywords, categories and the like that are used to search for data items in a data base. Merely for example, the data items may include profiles that describe users who socially interact with one another on a network-based social platform such as Facebook®—A Social Utility that Connects You with the People Around You, of Menlo Park, Calif. The saved search module may further be configured to generate search results based on properties that were stored in a database based on user behavior that was identified in conjunction with a previous execution of the saved search. Merely for example, one user behavior that may be identified with the search result for the saved search may include viewing a data item that describes a person who speaks Italian and lives in California that, in turn, causes the storing of a property that includes the attribute-value pair "LANGUAGE=ITALIAN" and a property that includes the attribute-value pair "RESIDENCE=CALIFORNIA." Accordingly, subsequent executions of the same saved search may utilize the above mentioned properties to identify the data items for the search result, order data items in the search result and surface specific information from the data items for display in the search result.

According to a third aspect of the disclosure, methods and systems for reordering the display of information in a data item based on preferred data item information are described.

The system may include a request module that is configured to receive a request from a client machine (e.g., mobile device, desktop computer, tablet, etc.) to display a single data item and a handler module that is configured to generate and format an interface (e.g., user interface) to display information in a single data item. The display of information in the data item may be reordered based on preferred data item information. For example, in the absence of the preferred data item information, a data item may include ten elements numbered one through ten and the elements may be displayed consecutively in ascending order. Alternately, in the presence of preferred data item information, the handler module may utilize the preferred data item information to reorder the display of information in the elements of the data item. For example, the handler module may utilize the preferred data item information to identify information in the elements of the data item as primary data item information (e.g., elements seven, eight, and nine) for immediate display responsive to receiving a request to view the data item and the other information in the remaining elements (e.g., elements one through six and ten) as secondary data item information for subsequent display (e.g., display that is responsive to receiving subsequent requests from the client machine (e.g., page down, scroll down, swipe down, etc.)). The preferred data item information may include a browsing history and a search history. The browsing history may include properties that were identified based on browsing requests that were received from the user and the search history may include constraints in queries that were received as search requests from the user.

Adapting Search Results Based on User Interactions

FIG. 1 is a block diagram illustrating a system 100, according to an embodiment, to adapt search results based on user interactions. The system 100 includes a client machine 102 coupled to a monitor 103 that receives search information (e.g., query) (operation "A") that is communicated over a network 104 (e.g., Internet) (operation "B") to an information store and retrieve platform 105 that includes a server machine 106 that, in turn, receives the search information with a receiving module 110 and processes the search information with a processing module 112. The server machine 106 may generate search results based on the search information, format a user interface 120 to include the search results, and communicate the user interface 120 back over the network 104 (operation "C") to the client machine 102 where it is displayed on the monitor 103 (operation "D") to a user who operates the client machine 102. The user may interact with the search results. For example, the user may "page-up," "page-down," "scroll-up," "scroll-down," or the like, and do so repeatedly. Responsive to receiving an interaction, after receiving multiple previous interactions, the client machine 102 may communicate an interaction request including a description of an interaction (e.g., "page-up) (operation "E") over the network 104 to the server machine 106 that, in turn, receives the interaction request, identifies a first formatting level based on the multiple previous interactions, transitions to a second formatting level based on the first formatting level and the interaction (e.g., "page-up) most recently received and communicates a second user interface 120 that is formatted based on the second formatting level, over the network 104 (operation "F"), to the client machine 102. The second formatting level being identified to better approximate the mindset of the user. Accordingly, the system 100 tracks the mindset of the user based on his or her interactions with the search results and formats the interfaces (e.g., user interfaces 120) accordingly. For example, a user who enters search information in the form of a query and receives search results may at first be "assessing" the search results to determine whether the query is sufficiently precise to identify the desired search results. Additional interactions with the search results may be suggestive of a shift in the mindset of the user. That is, the additional interactions may suggest the user has moved beyond an assessment of the precision of the query and is now shopping the data items by making comparisons. Further interactions may be suggestive of yet another shift of mindset of the user who may now no longer be shopping but now looking at specific data items.

Figure 2:
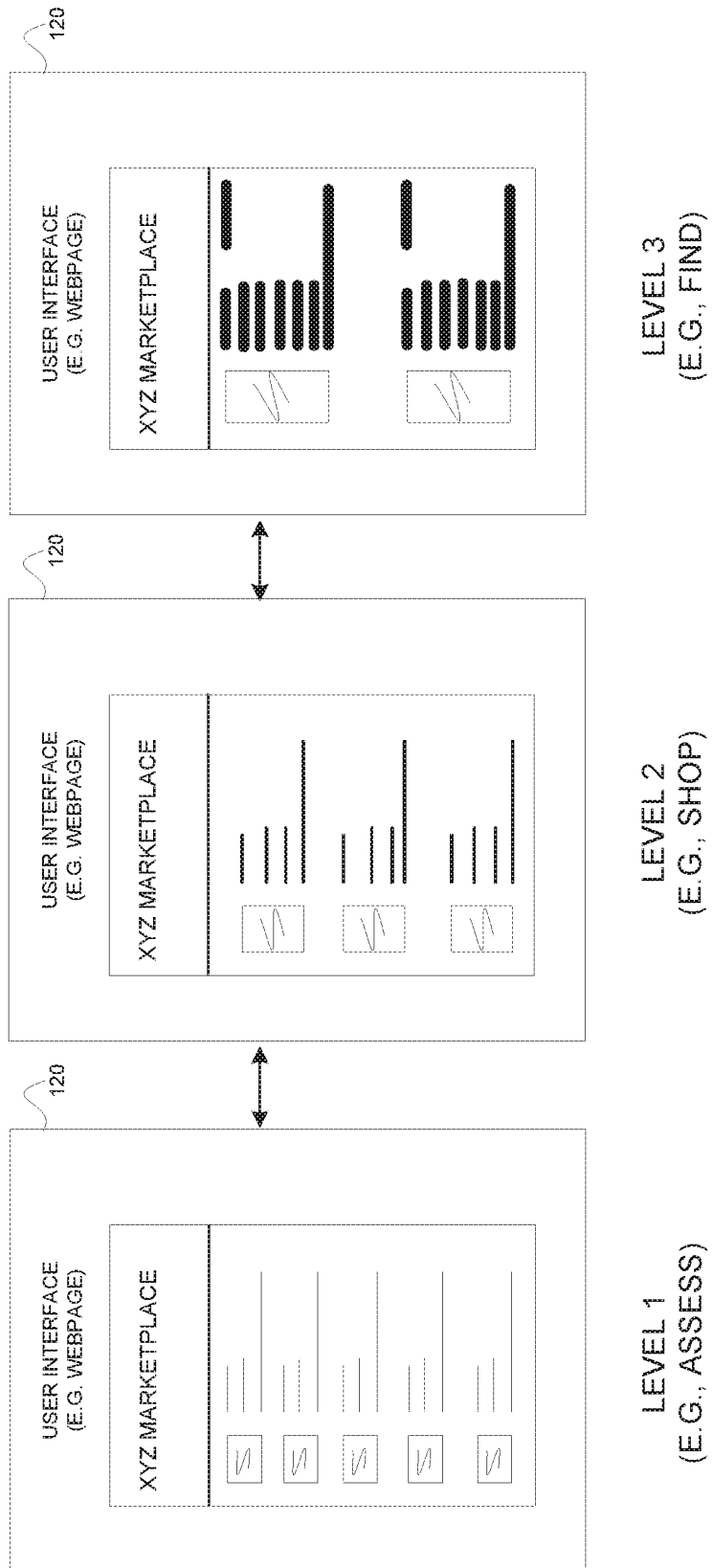
FIG. 2 illustrates interfaces formatted according to different formats, according to an embodiment

FIG. 2 illustrates interfaces formatted according to different formats, according to an embodiment. Illustrated on the left is a user interface 120 formatted in an "ASSESS" or "LEVEL 1" level/format which is associated with a low number of user interactions with the search results (e.g., less than a predetermined threshold number of user interactions that may be configurable). Illustrated in the middle is the user interface 120 formatted in an "SHOP" or "LEVEL 2" level/format which is associated with a moderate number of user interactions with the search results (e.g., less than a predetermined threshold number of user interactions that may be configurable). Illustrated on the right is the user interface 120 formatted in a "FIND" or "LEVEL 3" level/format which is associated with a large number of user interactions with the search results (e.g., less than a predetermined threshold number of user interactions that may be configurable). Other embodiments may include additional levels formats and thresholds that are configurable.

The user interface 120 is illustrated as displaying a varying number of data items (e.g., LEVEL1 illustrates five data items; LEVEL2 illustrates three data items; and LEVEL3 illustrates two data items). Merely for example, the data items may be embodied as listings that describe items or services for sale on a network-based marketplace such as eBay®. The listings may include elements that include as a title, a description that describes the item or service, a price that the item is being offered for sale, a condition (e.g., used, new, etc.), an image or the item or service, a sales format (e.g., immediate purchase, auction, Dutch auction etc.), a location from which the item may be shipped or the service may be performed, etc. Also for example, according to another embodiment, the data items may include profiles that describe people that network in a network-based social network such as Facebook®. Further, the profiles may include elements that include a name of a person, friends of the person, demographics of the person including their residence, nationality, etc., a history of education including the schools attended by the person, a picture of the person and other discrete pieces of information related to the person. In comparing the "LEVEL 1" format with the "LEVEL 2" format one may observe a fewer number of data items per user interface (e.g., three in LEVEL 2), more elements per data item (e.g., four in LEVEL 2) and a larger image per data item. In comparing the "LEVEL 2" format with the "LEVEL 3" format one may, again, observe fewer data items per user interface (e.g., two in LEVEL 3), more elements per data item (e.g., eight in LEVEL 3), and a larger image in each data item.

Returning to FIG. 1, the system 100 further includes a database 114 that is coupled to the server machine 106 which stores user information 116, formatting level summary information 118 and data item information 119, as described further below. It will be appreciated that other embodiments may include a client machine 102 that performs the formatting. For example, in such an embodiment, the receiving module 110 and the processing module 112 may be adapted to perform the same or similar functions on the client machine 102 and the user information 116 and the formatting level summary information 118 may be stored on the client machine 102. In yet another embodiment, the receiving module 110 and the processing module 112 may be adapted to perform the same or similar functions on the client machine 102 and portions of the user information 116 and the formatting level summary information 118 may be communicated to the client machine 102 to perform the same functions.

Figure 3A:
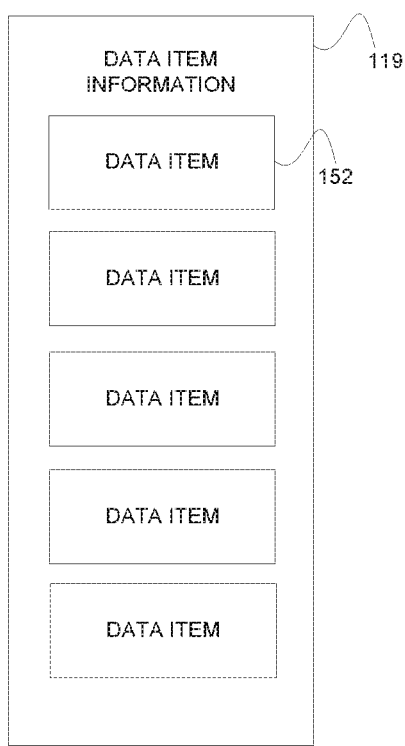
FIG. 3A is a block diagram illustrating data item information, according to an embodiment.

FIG. 3A is a block diagram illustrating data item information 119, according to an embodiment. The data item information 119 may include one or more data items 152. The data item information 119 may be accessed with a key (e.g., data item identifier) that is used to uniquely identify each of the data items 152.

Figure 3B:
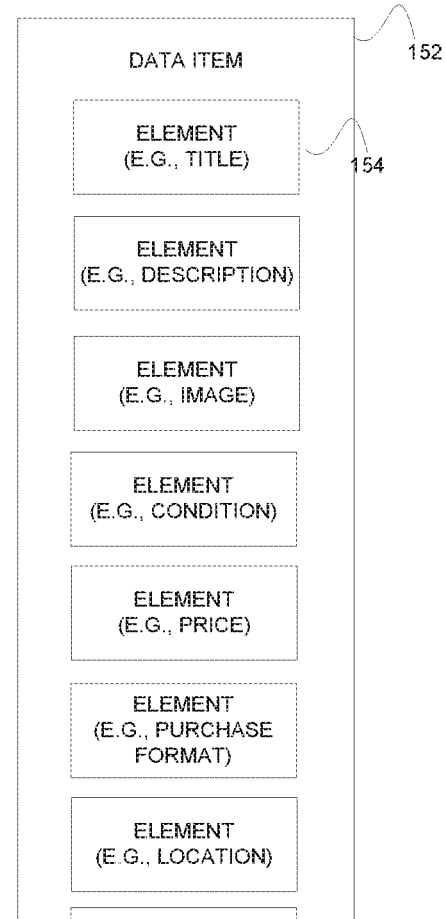
FIG. 3B is a block diagram illustrating a data item, according to an embodiment.

FIG. 3B is a block diagram illustrating a data item 152, according to an embodiment. The data item 152 may include one or more elements 154. For example, in one embodiment, the data item 152 may be used to describe a listing of an item that is being offered for sale on a network-based marketplace and the elements 154 may include a title of the item, a description of the item, an image of the item, a condition of the item (e.g., used, new, etc.), a price to purchase the item, a purchase format (e.g., auction, immediate sale), a location of the seller, links to relevant information, and a data item identifier that uniquely identifies the data item 152 from other data items 152 in the data item information 119, as shown in FIG. 3A.

Figure 3C:
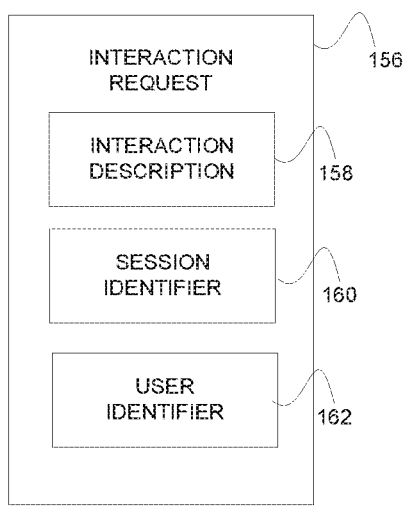
FIG. 3C is a block diagram illustrating a request, according to an embodiment.

FIG. 3C is a block diagram illustrating an interaction request 156, according to an embodiment. The interaction request 156 may be communicated from the client machine 102 to the server machine 106. The interaction request 156 may include an interaction description 158 that describes and interaction with the search results, a session identifier 160 that identifies a set of one or more interactions associated with a single search record, and a user identifier 162 to identify a user on the information store and retrieve platform 105.

Figure 4A:
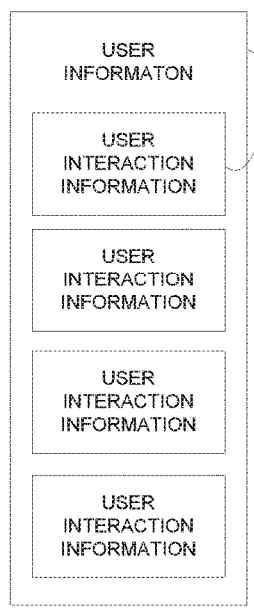
FIG. 4A is a block diagram illustrating user information, according to an embodiment.

FIG. 4A is a block diagram illustrating user information 116, according to an embodiment. The user information 116 may include multiple user interaction information 200 entries. A user interaction information 200 entry is used to store and retrieve information for a particular user that uses the information store and retrieve platform 105.

Figure 4B:
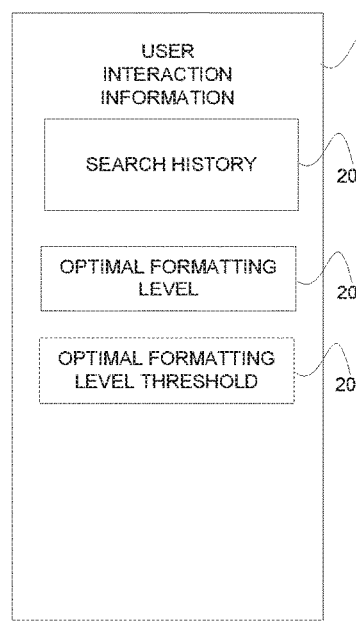
FIG. 4B is a block diagram illustrating user interaction information, according to an embodiment.

FIG. 4B is a block diagram illustrating user interaction information 200, according to an embodiment. The user interaction information 200 may include a search history 202, an optimal formatting level 206, and an optimal formatting level threshold 207. The search history 202 may be used to store information about searches that are executed by the user. The optimal formatting level 206 identifies the formatting level associated with the most number of purchases for the user. For example, a user, "John Doe," may be associated with three, four and five purchases that were respectively recorded at formatting levels three, four and five resulting in an optimal formatting level 206 of five for the user "John Doe." The optimal formatting level 206 may change based on purchases of the user, as recorded at one or more formatting levels, and analysed to generate the optimal formatting level 206. The optimal formatting level threshold 207 may be used to identify whether to advance over intervening formatting levels to the optimal formatting level 206. For example, identifying a level transition to the optimal formatting level threshold 207 of "LEVEL 3" may result in advancing over intermediate "LEVEL 4" and intermediate "LEVEL 5" to immediately format the interface (e.g., user interface 120) with the optimal formatting level 206, "LEVEL 6."

Figure 4C:
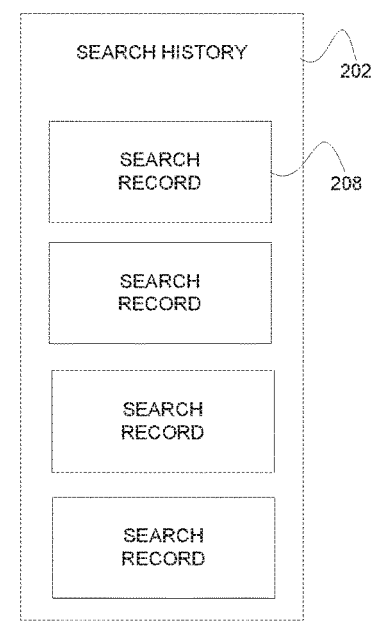
FIG. 4C is a block diagram illustrating search history, according to an embodiment.

FIG. 4C is a block diagram illustrating a search history 202, according to an embodiment. The search history 202 may store multiple search records 208. Each search record 208 is used to store information about a particular search that was executed by the user.

Figure 4D:
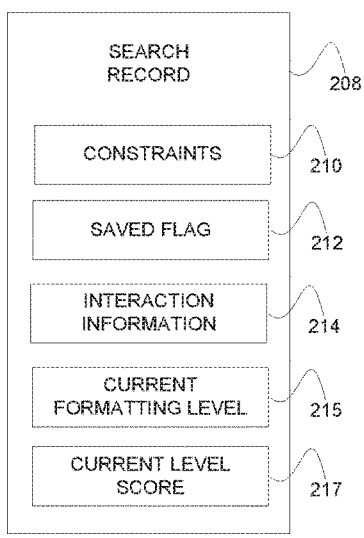
FIG. 4D is a block diagram illustrating a search record, according to an embodiment.

FIG. 4D is a block diagram illustrating a search record 208, according to an embodiment. The search record 208 may include constraints 210, a saved flag 212, interaction information 214, a current formatting level 215, and a current level score 217. The constraints 210 may be received by the information store and retrieve platform 105 to initiate a search. For example, a user may initiate a search by entering constraints 210 that are used to search the data items 152. For example, the constraints 210 may include one or more keywords including "batman comic books," or one or more categories including "books," "mysteries," "Alfred Hitchcock," or one or more images, or the like for filtering to identify the desired data items 152. The saved flag 212 may be asserted to signify the constraints 210 may be subsequently reused to execute another search. For example, a user may enter the constraints 210 "batman comic books" and execute subsequent searches using the same constraints 210 merely by identifying the search record 208 through an interface (e.g., user interface 120). The interaction information 214 may include interaction records associated with the search. The current formatting level 215 may be identified based on the current level score 217. The current level score 217 may be computed based on the interaction records in the interaction information 214.

Figure 4E:
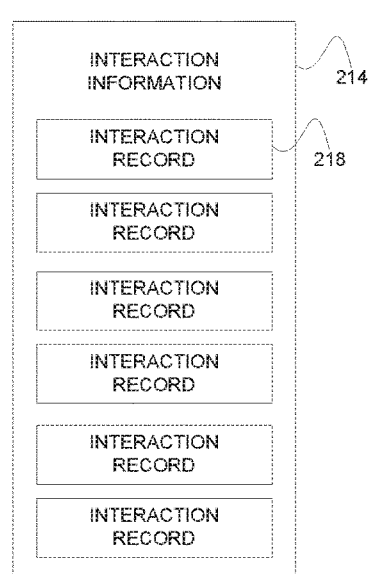
FIG. 4E is a block diagram illustrating interaction information, according to an embodiment.

FIG. 4E is a block diagram illustrating interaction information 214, according to an embodiment. The interaction information 214 may include one or more interaction record 218.

Figure 4F:
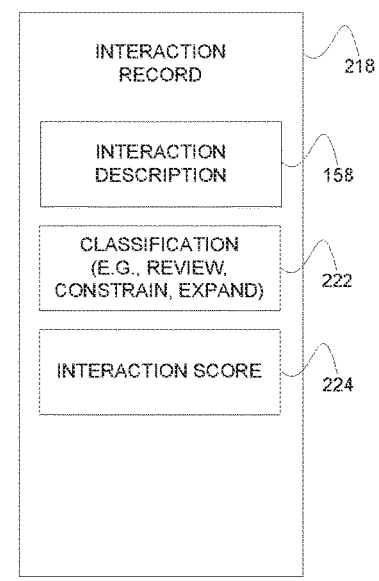
FIG. 4F is a block diagram illustrating an interaction record, according to an embodiment.

FIG. 4F is a block diagram illustrating an interaction record 218, according to an embodiment. The interaction record 218 may include an interaction description 158, a classification 222, and an interaction score 224. The interaction description 158 may describe the interaction. For example, the interaction description 158 may include a "page up" to display data items 152 appearing a page earlier in the search results, a "page down" to display data items 152 appearing a page later in the search results, a "swipe-up" to display data items 152 appearing multiple pages earlier in the search results, a "swipe-down" to display data items 152 appearing multiple pages later in the search results, a "scroll up" to display data items 152 appearing multiple pages earlier in the search results, a "scroll down" to display data items 152 appearing multiple pages later in the search results, an "add constraint(s)" to add one or more constraints 210 to the constraints 210, a "remove constraint(s)" to remove one or more constraints 210 from the constraints 210, and the like. The classification 222 may be used to classify the interaction. For example, the "page up," "page down," "swipe-up," "swipe-down," "scroll-up," "scroll-down," interactions may be classified "REVIEW," the "add constraint(s)" interaction may be classified "ADD CONSTRAINT" and the "remove constraint(s)" interaction may be classified "REMOVE CONSTRAINT." The "REVIEW," "ADD CONSTRAINT," and "REMOVE CONSTRAINT" classifications 222 may further be associated with scores that are added together to generate the current level score 217 that is used identify the current formatting level 215. The interaction description 158, the classification 222, and the interaction score 224 may be predetermined and associated with each other, according to one embodiment, as follows:

| interaction description 158 | classification 222 | interaction score 224 |
|---|---|---|
| "page-up" | "REVIEW" | +1 |
| "page-down" | "REVIEW" | +1 |
| "scroll-up" | "REVIEW" | +2 |
| "scroll-down" | "REVIEW" | +2 |
| "swipe-up" | "REVIEW" | +3 |
| "swipe-down" | "REVIEW" | +3 |
| "remove constraint(s)" | "REMOVE" | Reset to "0" |
| "add constraint(s)" | "ADD" | Reset to "0" |

In one embodiment the interaction description 158, classification 222, interaction score 224 may be received from the client machine 102 by the information store and retrieve platform 105. In another embodiment, the interaction description 158 may be received from the client machine 102 by the information store and retrieve platform 105 and the information store and retrieve platform 105 may identify the classification 222, and the interaction score 224 based on the interaction description 158.

FIG. 5A is a block diagram illustrating formatting level summary information 118, according to an embodiment. The formatting level summary information 118 may include one or more formatting level information 250 entries that collectively describe the formatting levels available to the information store and retrieve platform 105. For example, the formatting level summary information 118 is illustrated to include four formatting levels.

FIG. 5B is a block diagram illustrating formatting level information 250, according to an embodiment. The formatting level information 250 may include a level identifier 252 (e.g., "LEVEL 1," "LEVEL 2," etc.) and definition information 254 that defines the formatting level. The definition information 254 may include interface area information 256, a number of data items displayed 258, a number of elements per data item 260, element descriptor information 262, and a minimum score 264. The interface area information 256 may describe the perimeter of and position of an area on the interface (e.g., user interface 120) to render the data items 152. For example, the interface area information 256 may include coordinates that identify the boundaries of the area (e.g., a rectangle of six inches by ten inches located in a particular quadrant of the user interface 120). The number of data items displayed 258 is the number of data items 152 to render in the area and the number of elements per data item 260 is the number of elements to render for a single data item 152. The element descriptor information 262 describes formatting for each of the particular elements 154 in a data item 152, as described further below. The minimum score 264 is a threshold used to identify whether to apply the definition information 254 associated with the formatting level.

FIG. 5C is a block diagram illustrating element descriptor information 262, according to an embodiment. The element descriptor information 262 describes formatting for the elements 154 in the data item 152. The element descriptor information 262 may include one or more element information 263 entries for each of the elements in the data item 152.

FIG. 5D is a block diagram illustrating element information 263, according to an embodiment. The element information 263 describes formatting of a particular element 154 in the data item 152. The element information 263 may include an element identifier 268 that uniquely identifies the element 154 in the data item 152, text information 270, and image information 272. The text information 270 may include a text point size, a text style, a text format (e.g., bold, italics, etc.) a text position and other formatting attributes that may be applied to text. The image information 272 may include a scaling factor to change the size of an image, an image style, a framing style (e.g., solid line boarder, broken line boarder, etc.) and other formatting attributes that may be applied to an image.

FIG. 6 is a block diagram illustrating a method 300, according to an embodiment, to adapt search results based on user interactions. Illustrated on the left is a client machine 102 and illustrated on the right is a server machine 106. The method 300 may commence at the operation 302 with the client machine 102 communicating search information to the server machine 106. The search information may include one or more constraints 210. For example, the search information may include constraints 210 in the form of keywords including "batman comic books."

At operation 304, at the server machine 106, the receiving module 110 may receive the search information. At operation 306, the processing module 112 may generate search results based on the search information. For example, the processing module 112 may apply the constraints 210 "batman comic books" to the data items 152 in the data item information 119 to generate search results that include a set of one or more data items 152 that match the constraints 210. The search results may include one or more pages of data items 152.

At operation 308, the processing module 112 may format an interface (e.g., user interface 120) based on the initial formatting level (e.g., "LEVEL 1"). For example, the processing module 112 may format a user interface 120 by applying the definition information 254 associated with the "ASSESS" formatting level as shown in FIG. 2 to data items 152 in the search result. At operation 310, the processing module 112 may communicate the user interface 120 to the client machine 102.

At operation 312, the client machine 102 may receive and display the user interface 120. At operation 314, the client machine 102 may communicate an interaction request 156 to the server machine 106. For example, the interaction request 156 may include an interaction description 158 to "page-down."

Figure 7A:
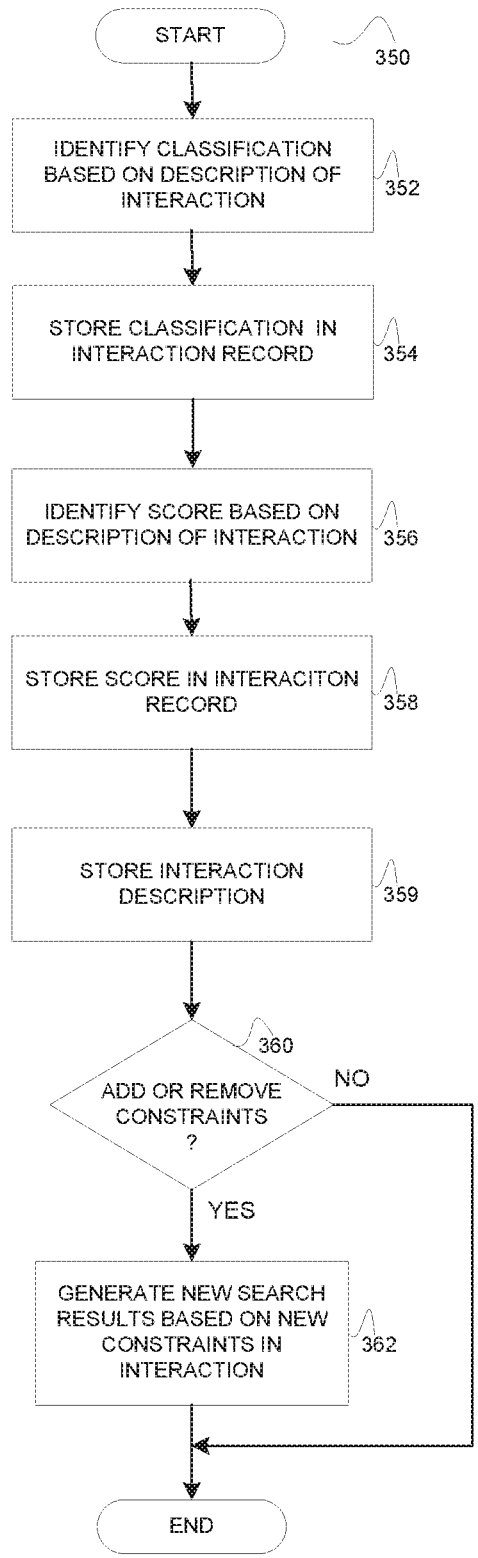
FIG. 7A is a block diagram illustrating a method, according to an embodiment, to receive a request and generate an interaction record.
Figure 7B:
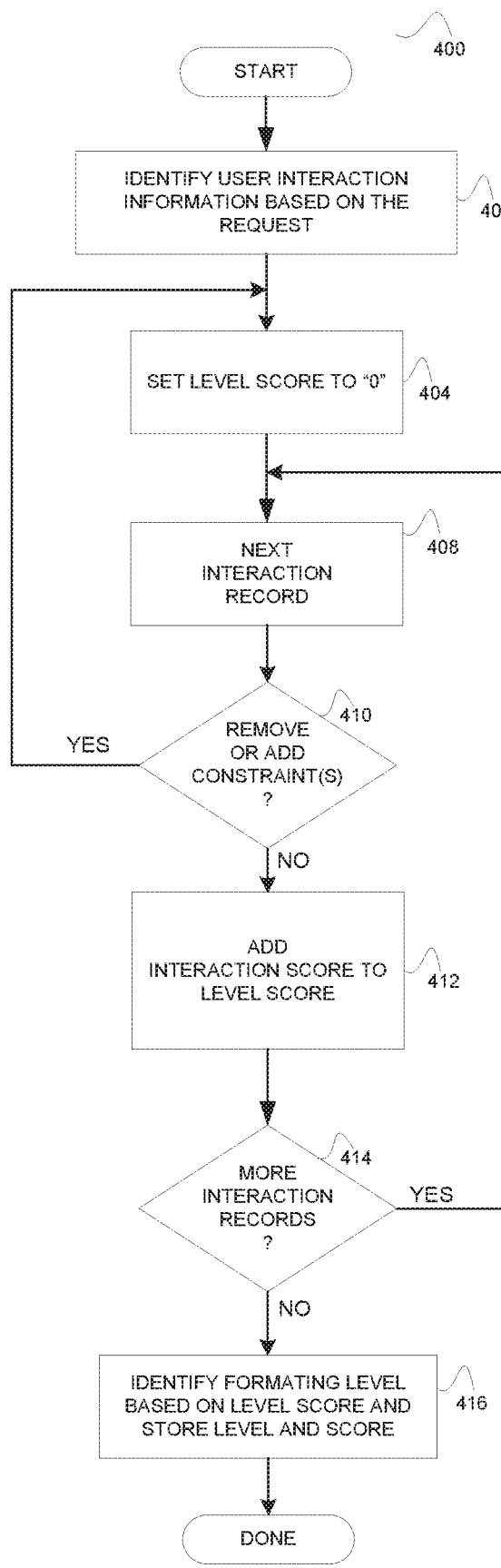
FIG. 7B is a flow chart illustrating a method, according to an embodiment, to identify an existing formatting level.

At operation 316, at the server machine 106, the receiving module 110 may receive and process the interaction request 156 to generate an interaction record 218, as described further in FIG. 7A. At operation 318, the processing module 112 may identify the current formatting level 215, as described further in FIG. 7B. For example, the processing module 112 may process all of the interaction records 218 that were received prior to the interaction record 218 most recently generated to identify the current level score 217 and the corresponding current formatting level 215. In the present example, no interactions were received prior to the present interaction record 218 to "page-down." At decision operation 320, the processing module 112 may identify whether to transition to a new formatting level, as described further in FIG. 7C. If the processing module 112 identifies a transition to a new formatting level then processing continues at operation 322. Otherwise processing continues at operation 324. At operation 322, the processing module 112 may format the interface (e.g., user interface 120) based on the new formatting level. For example, in another example where multiple "page-down" interactions had been received, the processing module 112 may format the search results based on the "SHOP" formatting level, as shown in FIG. 2. To this end, according to one example, the processing module 112 may apply the definition information 254 associated with the "SHOP" formatting level including interface area information 256 to identify the boundaries of an area in the interface (e.g., user interface 120), a number of data items displayed 258 that defines the number of data items 152 to include in the area, a number of elements per data item 260 that defines the number of elements 154 to include per data item 152, and element descriptor information 262 that is used to format the particular elements 154 in the data item 152. At operation 324, the processing module 112 may format the interface (e.g., user interface 120) based on the current formatting level 215. For example, the processing module 112 may apply the definition information 254 associated with the "ASSESS" formatting level. At operation 325, the processing module 112 may add the interaction record 218 that was previously generated (e.g., as shown in FIG. 7B) to the appropriate interaction information 214. At operation 326, the processing module 112 may communicate the user interface 120 including the search results to the client machine 102.

At operation 328, the client machine 102 may receive and display the user interface 120.

FIG. 7A is a block diagram illustrating a method 350, according to an embodiment, to receive an interaction request 156 and generate an interaction record 218. The method 350 may commence at operation 352 with the receiving module 110 identifying a classification 222 based the interaction description 158 in the interaction request 156. For example, the receiving module 110 may associate a "page-down" interaction with the "REVIEW" classification 222. At operation 354, the receiving module 110 may store the classification 222 in the interaction record 218. At operation 356, the receiving module 110 may identify an interaction score 224 based on the "page-down" interaction. For example, the receiving module 110 may associate an interaction score 224 of "+1" with the "page-down" interaction. At operation 358, the receiving module 110 may store the interaction score 224 in the interaction record 218. At operation 359, the receiving module 110 may copy the interaction description 158 from the interaction request 156 to the interaction description 158 in the interaction record 218. At decision operation 360, the receiving module 110 may identify whether constraints 210 are added or removed from the original constraints 210. For example, the receiving module 110 may compare the constraints 210 in the interaction description 158 with the constraints 210 in the search record 208. If constraints 210 are added or removed from the original constraints 210 then a branch is made to operation 362. At operation 362, the receiving module 110 may generate new search results based on the new set of constraints 210. For example, the constraint 210 "Joker" may be added to the original constraints 210 "batman comic books" to form the new set of constraints 210, "batman comic books Joker." Also, for example, the constraint 210 "comic books" may be removed from the original constraints 210 to form the new set of constraints 210, "batman."

FIG. 7B is a block diagram illustrating a method 400, according to an embodiment, to identify an existing formatting level. The method 400 processes all of the interaction records 218 associated with the present search other than the most recent interaction record 218 to identify the current level score 217 and the corresponding current formatting level 215. The method 400 may commence at operation 402 with the processing module 112 identifying the appropriate interaction information 214 based on the interaction request 156. For example, the processing module 112 may use the user identifier 162 and the session identifier 160 in the interaction request 156 to identify the appropriate interaction information 214. At operation 404, the processing module 112 may set a level score to "0." At operation 408, the processing module 112 may advance to the next interaction record 218. At decision operation 410, the processing module 112 may identify whether the interaction record 218 includes a classification 222 that describes that addition or removal of constraints 210. For example, the processing module 112 may identify whether the classification 222 matches an "ADD CONSTRAINT" or "REMOVE CONSTRAINT" classification 222. If the processing module 112 identifies a match, then a branch is made to operation 404. Otherwise a branch is made to operation 412. At operation 412, the processing module 112 may add the interaction score 224 in the interaction record 218 to the level score. For example, the processing module 112 may add an interaction score 224 of "+2" to a level score of "+1" to generate a new level score of "+3." At decision operation 414, the processing module 112 may identify whether there are more interaction records 218. If there are more interaction records 218 then a branch is made to operation 408. Otherwise processing continues at operation 416. At operation 416, the processing module 112 may identify a formatting level based on the level score, store the formatting level as the current formatting level 215 in the search record 208, and store the level score as the current level score 217 in the search record 208. For example, the processing module 112 may compare the level score with the minimum score 264 for the respective formatting levels to identify the formatting level. If, for example, the level score is less than a minimum score 264 for the "FIND" level but greater than a minimum score 264 for the "SHOP" level then the processing module 112 identifies and stores the "SHOP" level.

In the above embodiment the current level score 217 is recomputed based on the interaction records 218 that are stored in the interaction information 214 responsive to receipt of an interaction request 156. In another embodiment the current level score 217 may not be recomputed based on the interaction records 218, but rather, the current level score 217 may be incrementally updated based on the interaction score 224 that is associated with the interaction request 156 responsive to receipt of the interaction request 156. In yet another embodiment, the current level score 217 may be stored on the client machine 102 in the form of a cookie and communicated to the server machine 106 in the interaction request 156.

Figure 7C:
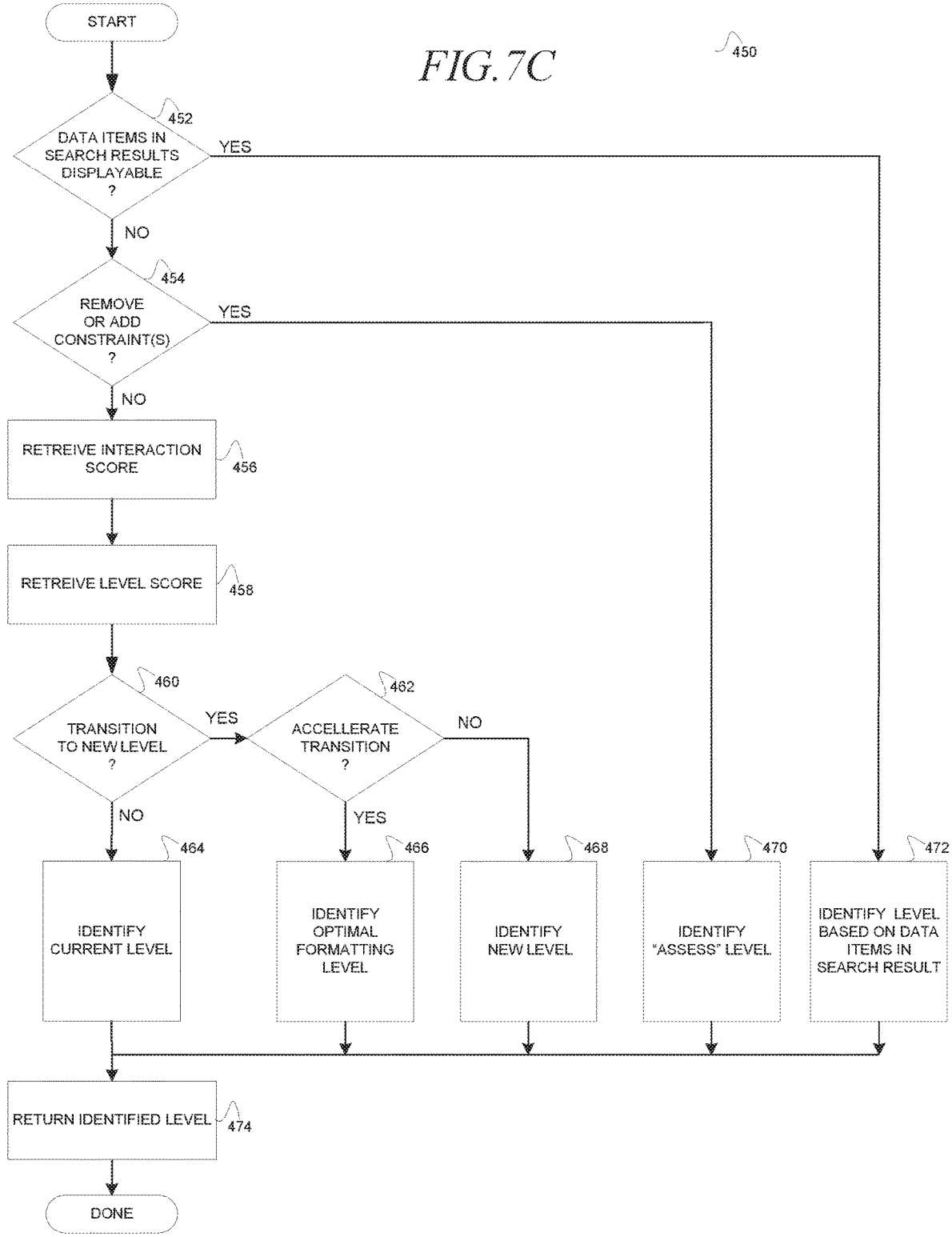
FIG. 7C is a flow chart illustrating a method, according to an embodiment, to identify whether to transition to a new formatting level.

FIG. 7C is a block diagram illustrating a method 450, according to an embodiment, to identify whether to transition to a new formatting level. The method 450 may commence at decision operation 452 with the processing module 112 identifying whether the data items 152 in the search results are displayable on a single interface (e.g., user interface 120). For example, the processing module 112 may compare the number of data items 152 in the search result with the value in number of data items displayed 258 of the respective formatting levels. If the data items 152 in the search results are displayable with a single interface (e.g., user interface 120) then a branch is made to operation 472. Otherwise a branch is made to decision operation 454. At decision operation 454, the processing module 112 may identify whether the most recently received interaction identifies an addition or removal of constraints 210. If the most recently received interaction identifies the addition or removal of constraints 210 then a branch is made to operation 470. Otherwise a branch is made to operation 456. At operation 456, the processing module 112 may retrieve the interaction score 224 for the most recently received interaction from the interaction record 218 generated for the most recently received interaction request 156. At operation 458, the processing module 112 may retrieve the current level score 217 that was generated (e.g., as shown in FIG. 7B) for the interactions records 218 other than the most recently generated interaction record 218. At decision operation 460, the processing module 112 may identify whether to transition to a new formatting level. For example, the processing module 112 may add the interaction score 224 to the current level score 217 to compute a sum and compare the sum with the minimum scores 264 associated with each of the formatting levels to identify a generated formatting level. For example, the processing module 112 may compare the sum with the value in each of the minimum scores 264 that are respectively associated with the different formatting levels. If, for example, the sum is less than a minimum score 264 for the "FIND" level but greater than a minimum score 264 for the "SHOP" level then the processing module 112 identifies the "SHOP" level as the generated formatting level. Finally, the processing module 112 compares the generated formatting level with the current formatting level 215 in the search record 208. If the generated formatting level is different from the current formatting level 215 then a branch is made to decision operation 462. Otherwise a branch is made to operation 464. At operation 464, the processing module 112 may identify the current formatting level 215. At decision operation 462, the processing module 112 may identify whether to make an accelerated transition to an optimal formatting level 206. For example, if the generated formatting level (e.g., new level) is greater than or equal to the optimal formatting level threshold 207 then a branch is made to operation 466. Otherwise a branch is made to operation 468. At operation 466, the processing module 112 may identify the optimal formatting level 206 for formatting the interface (e.g., user interface 120). At operation 468, the processing module 112 may identify the generated formatting level as the new formatting level. At operation 470, the processing module 112 may identify the "ASSESS" formatting level or the lowest formatting level for formatting an interface (e.g., user interface 120). At operation 472, the processing module 112 may identify the formatting level for formatting an interface (e.g., user interface 120) based on the number of data items 152 in the search result, as described above. At operation 474, the processing module 112 may return the identified level.

Adapting Search Results Based on a Saved Search

Figure 8A:
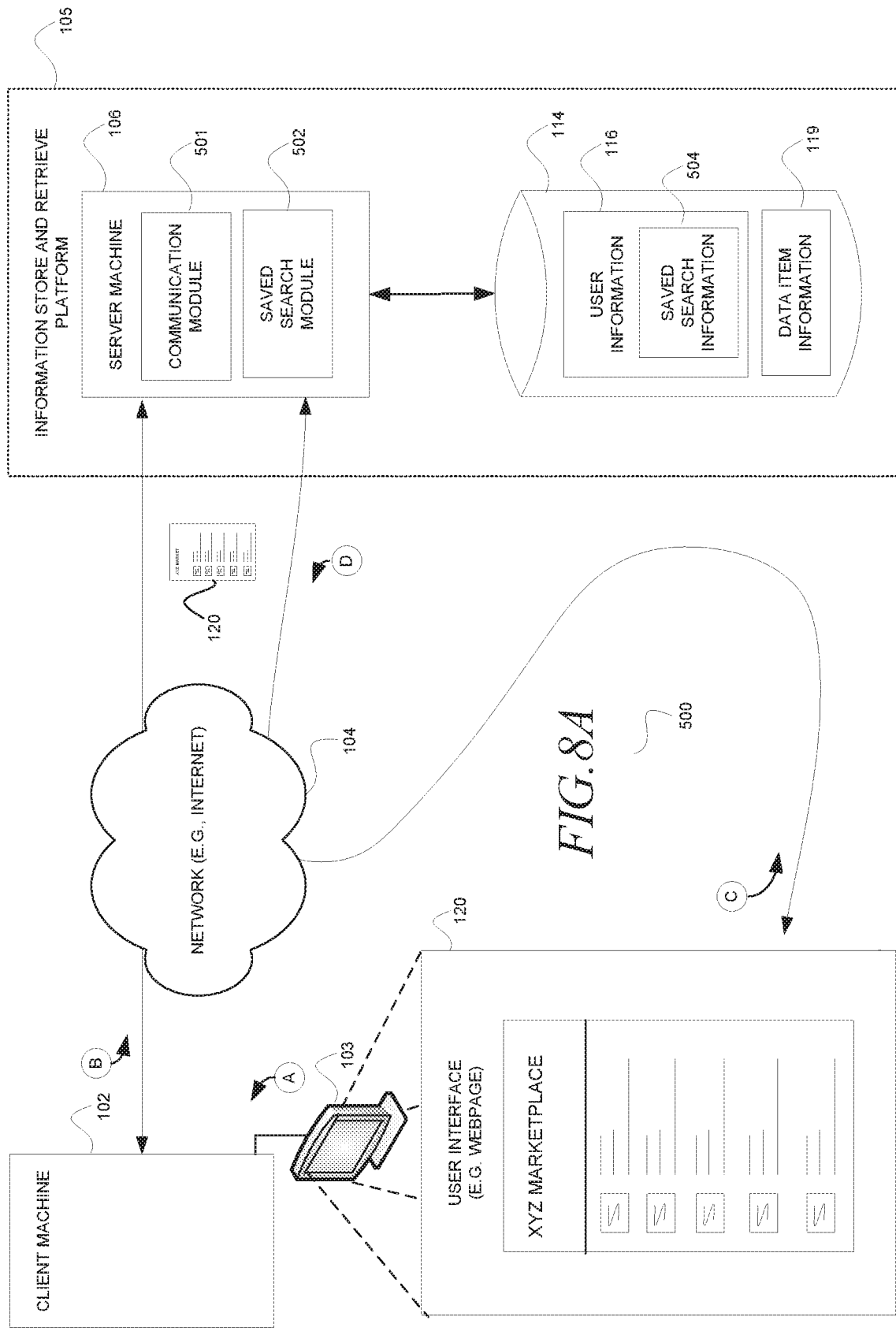
FIG. 8A is a block diagram illustrating a system, according to an embodiment, to adapt search results based on a saved search.

FIG. 8A is a block diagram illustrating a system 500, according to an embodiment, to adapt search results based on a saved search. The system 500 may include a client machine 102 coupled to a monitor 103 that receives constraints 210 (e.g., query) (operation "A") for a saved search that is communicated over a network 104 (e.g., Internet) (operation "B") to an information store and retrieve platform 105 that includes a server machine 106 that, in turn, includes a communication module 501 that receives the constraints 210, as previously described, a saved search module 502 that stores the constraints 210 for subsequent execution. The storage of the constraints 210 enables a repeated execution of the saved search without reentry of the constraints 210. For example, a user who is shopping for a car may create a saved search by entering the constraints 210 "Camaro sports car" and repeatedly executing the saved search at various times without reentering constraints 210. To this end, the client machine 102 may communicate an identifier that identifies a particular saved search over the network 104 (operation "C") to the server machine 106 where it is received by communication module 501 and processed by the saved search module 502 to identify the constraints 210 associated with the particular saved search and generate search results that are communicated (operation "D") back to the client machine 102. The search results may be generated, as expected, based on the constraints 210, but also on properties that are identified based on previous executions of the saved search. For example, previous executions of the saved search may be associated with user behaviour that is processed to identify properties that are subsequently used to generate search results responsive to execution of the saved search. Behaviours may include interactions with the search results and other types of behaviours including receiving a bid for an item that is described by a data item 152, as previously described, receiving a request to view a data item 152, receiving a request to send an email to the seller of an item that is described by the data item 152, and the like. For example, constraints 210 for a saved search may include "Camaro sports car" and properties may include the color red (e.g., COLOR=RED) or a price range of $10K to 20K (e.g., PRICE RANGE=$10-20K, USD) that were identified as previous behaviours of the user who executed the saved search. Accordingly, behaviour associated with a saved search may be used to identify properties 560 that, in turn, may be used to generate and format search results. The properties 560 may be used to generate and format search results in at least three ways. The properties 560 may be used to identify the data items 152 that are included in the search results, an ordering of the data items 152 in the search results and the surfacing of specific information from the data items 152 for display in the search results.

It will be appreciated that other embodiments may include a client machine 102 that generates the search results based on the constraints and properties and generates and formats the interface (e.g., user interface) based on the search results. For example, in such an embodiment, the communication module 501 and the saved search module 502 may be adapted to perform the same or similar functions on the client machine 102 and portions of the saved search information 504 may be stored on the client machine 102. In yet another embodiment, the communication module 501 and the saved search module 502 may be adapted to perform the same or similar functions on the client machine 102 and portions of the saved search information 504 may be communicated to the client machine 102 as are necessary to perform the same functions.

Figure 8B:
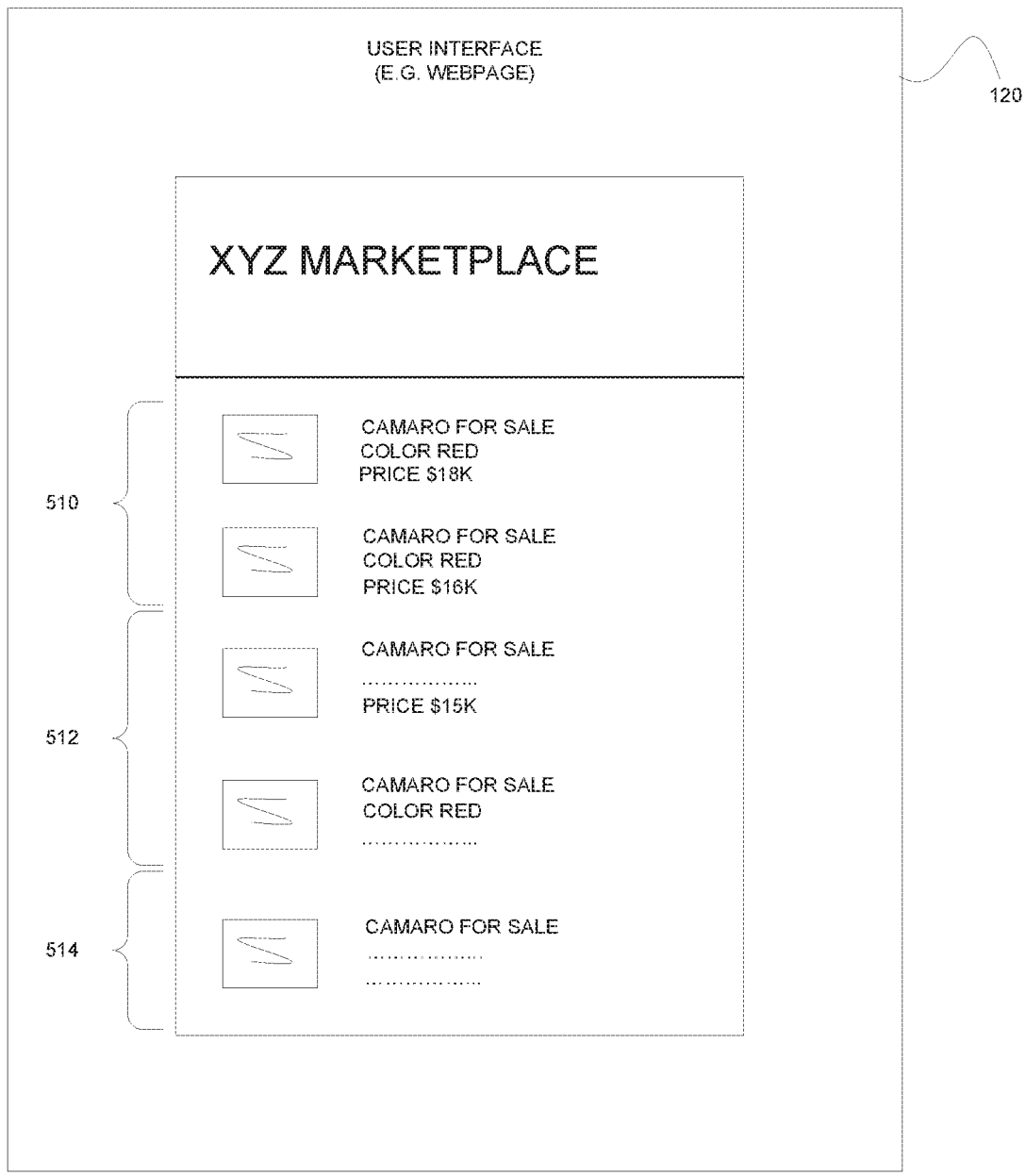
FIG. 8B is a block diagram illustrating a user interface, according to an embodiment, generated based on properties.

FIG. 8B is a block diagram illustrating a user interface 120, according to an embodiment, that is generated based on constraints 210 and properties associated with a saved search. For example, the constraints 210 for a saved search may include the keywords, "Camaro sports car" and the properties that were identified based on previous executions of a saved search may include COLOR=RED, and PRICE RANGE=$15-20K, USD. The properties 560 may be used to identify the data items 152 that are included in the search results, an ordering of the data items 152 in the search results and the surfacing of specific information from the data items 152 for display in the search results.

The search results may be generated using the constraints 210 and the properties. For example, according to one embodiment, the constraints 210 may be OR'd with the properties to generate the search results that are included on the user interface 120, as described further below.

The search results may be ordered on the user interface 120 based on the above mentioned properties. Consider a data item 152 that includes elements 154 that describe an item for sale. For example, the elements 154 may include a title, a description, and an image, etc. as previously described. At callout 510, two data items 152 are displayed before other data items 152 in the search results because the element 154 for description in the two data items 152 includes text that matches on both of the identified properties (e.g., COLOR=RED AND PRICE RANGE=$15-20K, USD). At callout 512, two data items are displayed after the data items 152 at callout 510 and before data items at callout 514 because the element 154 for description in the two data items 152 includes text that matches on only one of the identified properties (e.g., COLOR=RED OR PRICE RANGE=$15-20K, USD). At callout 514, one data item is displayed after the data items 152 at callout 510 and callout 512 because the element 154 for description in the data item 152 does not include text that matches either of the identified properties (e.g., COLOR=RED OR PRICE RANGE=$15-20K, USD). Accordingly, data items 152 are displayed in an order according to the number of properties that match the elements 154 in the data item 152. In another embodiment, the properties may match the content of different elements 154 in data item 152. For example, the property for PRICE RANGE=$15-20K, USD may match the element 154 for price in the data item 152. Accordingly, the user interface 120, as illustrated in FIG. 8B, may be generated based on a match of the PRICE RANGE=$15-20K, USD with the element 154 for description or the element 154 for price.

The surfacing of specific information from the data items 152 are further illustrated in FIG. 8B as being displayed in the search results. For example, notwithstanding some elements 154 always being surfaced or displayed (e.g., the title, "CAMARO FOR SALE," and the image) other elements 154 such as the element 154 for a description may only partially be displayed and the properties may be used to identify the specific information that is displayed. For example, in the absence of a match, other information from a particular element 154 (e.g., " . . . ") may be displayed.

Returning to FIG. 8A, the information store and retrieve platform 105 includes user information 116 and data item information 119, as previously described in FIG. 3A, as previously described in FIG. 4A. The user information 116 is now illustrated as further including saved search information 504.

Figure 9A:
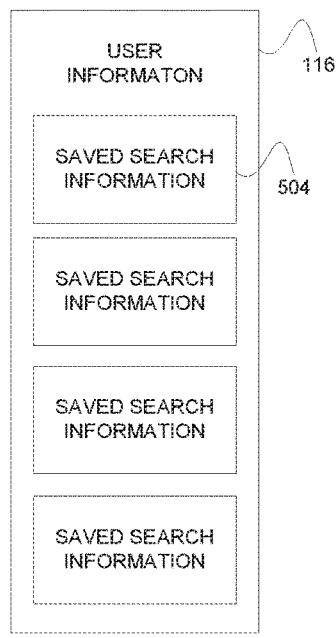
FIG. 9A is a block diagram illustrating user information, according to an embodiment.

FIG. 9A is a block diagram illustrating user information 116, according to an embodiment. The user information 116 may include multiple saved search information 504 entries. A saved search information 504 entry may be used to store and retrieve information for a particular user that uses the information store and retrieve platform 105.

Figure 9B:
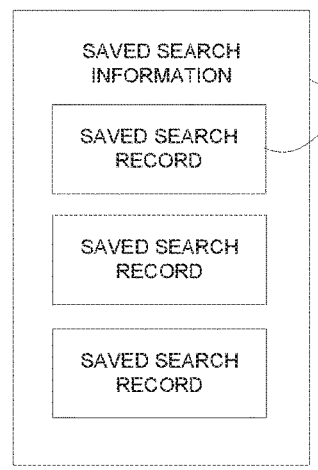
FIG. 9B is a block diagram illustrating saved search information, according to an embodiment.

FIG. 9B is a block diagram illustrating saved search information 504, according to an embodiment. The saved search information 504 may be used store saved search records 552 for a particular user. A user may not use the feature or save one or multiple saved search records 552.

Figure 9C:
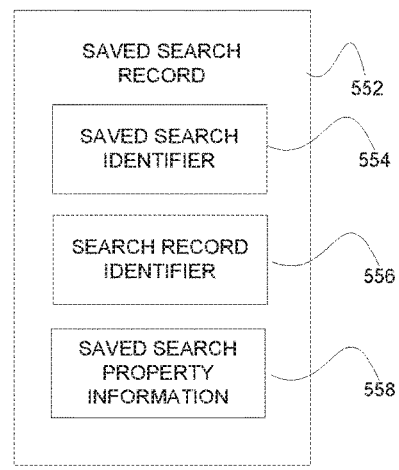
FIG. 9C is a block diagram illustrating, a saved search record according to an embodiment.

FIG. 9C is a block diagram illustrating a saved search record 552, according to an embodiment. The saved search record 552 may include a saved search identifier 554 that identifies the saved search from other saved searches, a search record identifier 556 that identifies a search record 208, and saved search property information 558. The search record identifier 556 may be used to retrieve the constraints 210 for the saved search and other fields from the search record 208. The saved search property information 558 may include one or more properties that are associated with the saved search.

Figure 9D:
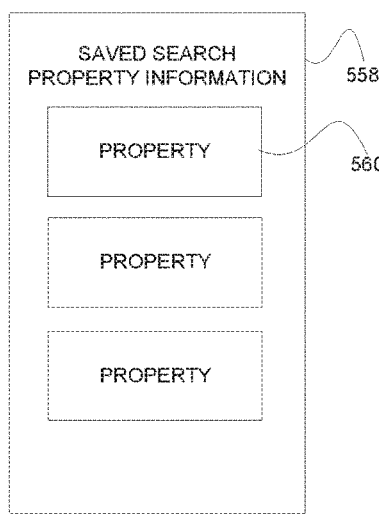
FIG. 9D is a block diagram illustrating saved search property information, according to an embodiment.

FIG. 9D is a block diagram illustrating saved search property information 558, according to an embodiment. The saved search property information 558 may include one or more entries of properties 560 that were identified and stored in association with the saved search based on the execution of the saved search. For example, the properties 560 may collectively characterize behaviour of the user that was learned during one or more executions of the saved search. For example, one of the search results associated with the saved search may include one or more data items 152 that were viewed by the user for a period of time that exceeds a predetermined threshold causing an identification of properties 560 based on the elements of the data item 152 and storage of the properties 560 in the saved search property information 558. Further for example, one or more properties 560 may be stored in the saved search property information 558 responsive to a user viewing a data item 152 for a quantity of time (e.g., 1 minute) that exceeds a predetermined threshold of (forty seconds) causing the saved search module 502 to identify one or more properties 560 based on the elements in the data item 152. Other behaviours associated with the search results of a saved search may include identification of receipt of a bid to win an item in an auction, identification of a purchase an item, identification of an email that is sent to the seller of an item, identification of a request to scale an image associated with an item, etc.

Figure 9E:
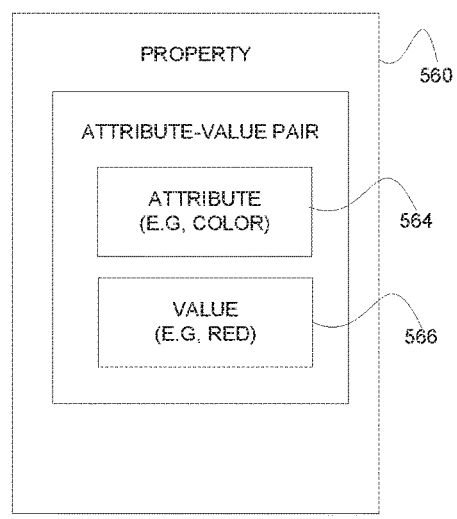
FIG. 9E is a block diagram illustrating a property, according to an embodiment.

FIG. 9E is a block diagram illustrating a property 560, according to an embodiment. The property 560 may be identified based on the information in a data item 152. The property 560 may be identified based on the information in one of the elements 154 in a data item 152. The property 560 may include an attribute-value pair that includes an attribute 564 and a value 566. The attribute may be used to describe an item or a service. For example, attributes may include color, height, width, weight, length, purpose, function, and the like. The value 566 may include text, a number or both. Examples of properties 560 may include the following:

COLOR=RED
PRICE=$15K, USD
WEIGHT=50, POUNDS
HEIGHT=6, FEET
ENGINE=8, CYLINDERS

FIG. 10A is a block diagram illustrating a method 600, according to an embodiment, to adapt a search result based on saved search. Illustrated on the left is a client machine 102 and illustrated on the right is a server machine 106. The method 600 may commence at operation 602 with the client machine 102 communicating constraints 210 for a saved search to the server machine 106.

At operation 604, at the server machine 106, the communication module 501 may receive the constraints 210. At operation 606, the saved search module 502 may generate and store a search record 208, as previously described. For example, the saved search module 502 may store the constraints 210 and assert the saved flag 212 in the search record 208. The constraints 210 may, for example, include the keywords, "Camaro Sports Car." At operation 607, the saved search module 502 may generate and store a saved search record 552. For example, the saved search module 502 may generate and store the saved search identifier 554 and the search record identifier 556.

At operation 608, the client machine 102 may communicate a request to execute a particular saved search. For example, the client machine 102 may communicate an identifier that identifies a saved search that includes the above mentioned constraints 210 "Camaro Sports Car."

At operation 610, at the server machine 106, the communication module 501 may receive the request. At operation 612, the saved search module 502 may generate search results based on the constraints 210 and further based on the saved search property information 558, as further described in FIG. 10B. At operation 613, the saved search module 502 may generate and format a user interface 120 based on the search results generated in operation 612. The saved search module 502 may format the user interface 120 by surfacing information in a data item 152 in the search results according to the properties 560. For example, the saved search module 502 may identify and surface portions of the data item 152 that match any of the properties 560 in the saved search property information 558. Accordingly, properties 560 (e.g., "COLOR=RED" OR "PRICE RANGE=$15-20K, USD) may be utilized to identify and surface one or more elements 154 in a data item 152 or portions of one or more elements 154 in a data item 152. For example, consider the following text that is included in an element 154 that is used for description:

"CAMARO FOR SALE, 8 cylinders, price is $17K, runs like a dream, 5 speed with racing stripe and leather interior and the outside color is red."

The properties 560 "COLOR=RED," "PRICE RANGE=$15-20K, USD" may be used to surface the following information:

". . . price is $17K . . . color is red"

The other information (e.g., "CAMARO FOR SALE . . . , 8 cylinders, . . . , runs like a dream, 5 speed with racing stripe and leather interior and the outside . . . ") may not be surfaced from the from the data item 152 because the other information fails to match any of the properties 560. Nevertheless, other elements 154 in the data item 152 may always be displayed, such as a title and image. At operation 614, the saved search module 502 may communicate the user interface 120 to the client machine 102.

At operation 616, the client machine 102 may receive and display the user interface 120 that includes the search results. At operation 618, the client machine 102 may communicate a request to perform a user behaviour that operates on the search results to the server machine 106. For example, the client machine 102 may communicate a request to view an item described by a data item 152 included in the search results.

At operation 620, at the server machine 106, the communication module 501 may receive the request. At operation 622, the saved search module 502 may perform the requested behaviour. For example, the saved search module 502 may cause another user interface 120 to be generated for viewing the data item 152 and communicate the user interface 120 back to the user.

At operation 624, the saved search module 502 may identify one or more properties 560 based on the user behaviour. For example, the saved search module 502 may identify one or more properties 560 based on the elements 154 in the data item 152 that was viewed. For example, in the above mentioned listing for the Camaro, the following properties 560 may be identified:

COLOR=RED
PRICE RANGE=$15-20K, USD
CYLINDERS=8

At operation 626, the saved search module 502 may store the one or more properties 560 in the saved search property information 558.

Figure 10B:
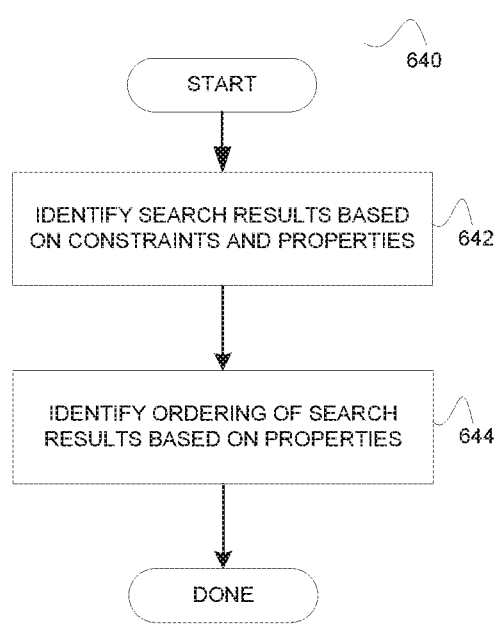
FIG. 10B is a flow chart illustrating a method, according to an embodiment, generate a search result based on properties.

FIG. 10B is a block diagram illustrating a method 640, according to an embodiment, for generating search results based on properties 560. At operation 642, the saved search module 502 may add the properties 560 to the constraints 210 prior to searching the data item information 119. For example, the saved search module 502 may identify data items 152 in the data item information 119 that match the constraints 210 and further match the properties 560. For example, the saved search module 502 may identify data items 152 that match the constraints 210 (("Camaro" OR "sports car") AND ("COLOR=RED" OR "PRICE RANGE=$15-20K, USD)) that are further combined with data items 152 that match the constraints 210 (("Camaro" OR "sports car") but NOT any of the properties 560. Accordingly, the search results are segregated into two groups of data items 152 where the first group matches the constraints 210 and at least one property 560 and the second group matches the constraints 210 but not any of the properties 560.

At operation 644, the saved search module 502 may order the search results according to the properties 560. For example, the saved search module 502 may order the data items 152 in the search results from the greatest number of matching properties 560 to the least number of matching properties 560 that are followed by data items 152 with no matching properties 560.

Figure 11:
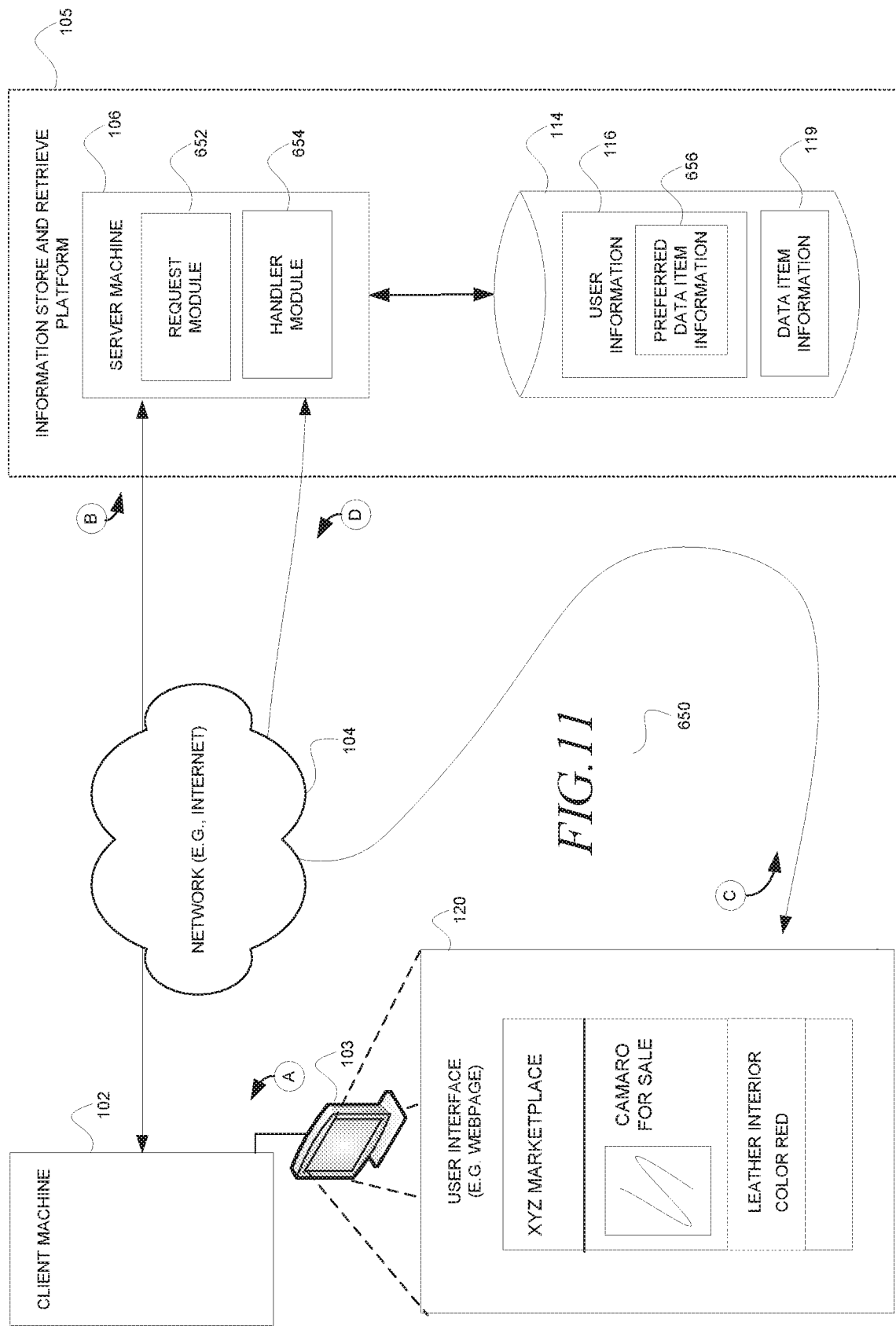
FIG. 11 is a block diagram illustrating a system, according to an embodiment, to reorder the display of information in a data item based on a preferred data item information.

Reordering the Display of Information in a Data Item Based on Preferred Data Item Information FIG. 11 is a block diagram illustrating a system 650, according to an embodiment, to reorder the display of information in a data item 152 based on preferred data item information. The system 650 may include a client machine 102 coupled to a monitor 103 that receives a request (operation "A") that is communicated over a network 104 (e.g., Internet) to an information store and retrieve platform 105 that includes a server machine 106 that, in turn, includes a request module 652 that receives the request (operation "B") and a handler module 654 that processes the request. The request may include a search request or a browsing request. The search request may include a query that includes one or more constraints 210, as previously described, which are stored as preferred data item information 656 in the form of search history information and utilized to generate search results. The browsing request may include a selection that may be utilized to identify data items or to navigate a hierarchy of categories that include the data items. Further, the browsing request may be used to identify one or more properties 560, as previously described, which are stored as preferred data item information 656 in the form of browsing history information. For example, the property may include a category, an attribute-value pair (e.g., CONDITION=NEW, AUTHOR=TOLSTOY), and the like that are stored as properties. A user may iterate the above described operations (operation A & B) causing the storage and accumulation of preferred data item information 656 (e.g., constraints 210 and properties). Subsequent to the storage and accumulation of the preferred data item information 656, a request to display a single data item 152 may be received from the client machine 102 and the information in a data item 152 may be selectively displayed based on the preferred data item information 656. For example, in the absence of preferred data item information 656, a data item 152 may include ten elements 154 numbered one through ten and the elements 154 may be displayed consecutively in ascending order. Further, in the absence of preferred data item information 656, the information in a particular element 154 may be displayed as entered by a user. According to one embodiment of the present disclosure, the preferred data item information 656 may be used to reorder the display of information in a data item 152.

Broadly, at the client machine 102, the monitor 103 may receive a request (operation "C") to view a data item 153 (e.g., listing) that is communicated over the network 104 (e.g., Internet) to the server machine 106 where the request module 652 receives the request and the handler module 654 processes the request to generate a user interface in the form of a listing page. The handler module 654 may reorder the display of the information in the data item 152 based on preferred data item information 656 (e.g., constraints 210, properties 560). According to an embodiment, the display of the information in the data item 152 may be reordered as primary data item information (e.g., "LEATHER INTERIOR" and "COLOR RED") for immediate display and as secondary data item information for subsequent display (e.g., after receiving a page-down, scroll-down, swipe-down, etc.).

It will be appreciated that other embodiments may include a client machine 102 that identifies the primary data item information based on preferred data item information 656 and generates and formats an interface (e.g., user interface) based on the primary data item information. For example, in such an embodiment, the request module 652 and the handler module 654 may be adapted to perform the same or similar functions on the client machine 102 and portions of the preferred data item information 656 may be stored on the client machine 102. In yet another embodiment, the request module 652 and the handler module 654 may be adapted to perform the same or similar functions on the client machine 102 and portions of the preferred data item information 656 may be communicated to the client machine 102 as are necessary to perform the same functions.

Figure 12A:
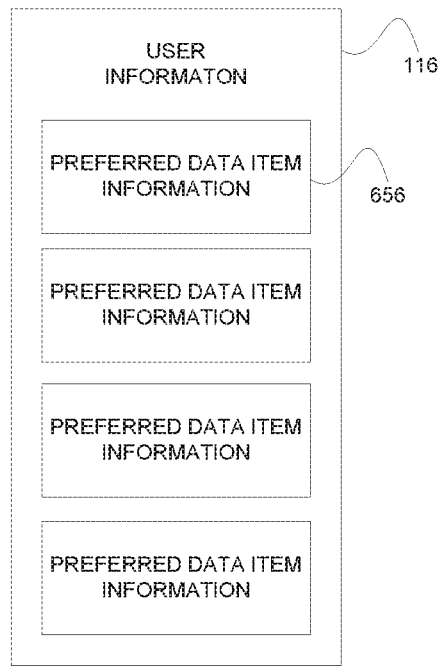
FIG. 12A is a block diagram illustrating user information, according to an embodiment.

FIG. 12A is a block diagram illustrating user information 116, according to an embodiment. The user information 116 may include multiple preferred data item information 656 entries that are respectively used to store and retrieve preferred data item information 656 for particular users.

Figure 12B:
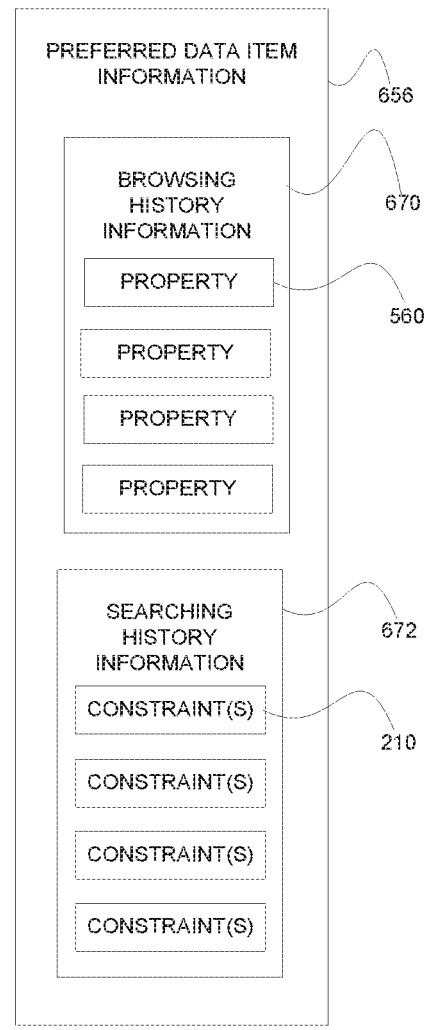
FIG. 12B is a block diagram illustrating preferred data item information, according to an embodiment.

FIG. 12B is a block diagram illustrating preferred data item information 656, according to an embodiment. The preferred data item information 656 may include browsing history information 670 and searching history information 672. The browsing history information 670 may include properties 560 that are identified based on the browsing history of the user. For example, the properties 560 may include category that may be navigated in a hierarchy of categories, a brand, a price range, a purchasing format (auction, buy it now), a color, a size specification, a condition (e.g., new, used, etc.), an item or service location (e.g., San Jose, Santa Clara County, Calif., United States, North America, etc.) or any other property that is descriptive of an object or service. The searching history information 672 may include constraints 210 that are received in a query for data items. The constraints 210 may include one or more keywords, categories, or the like.

Figure 13:
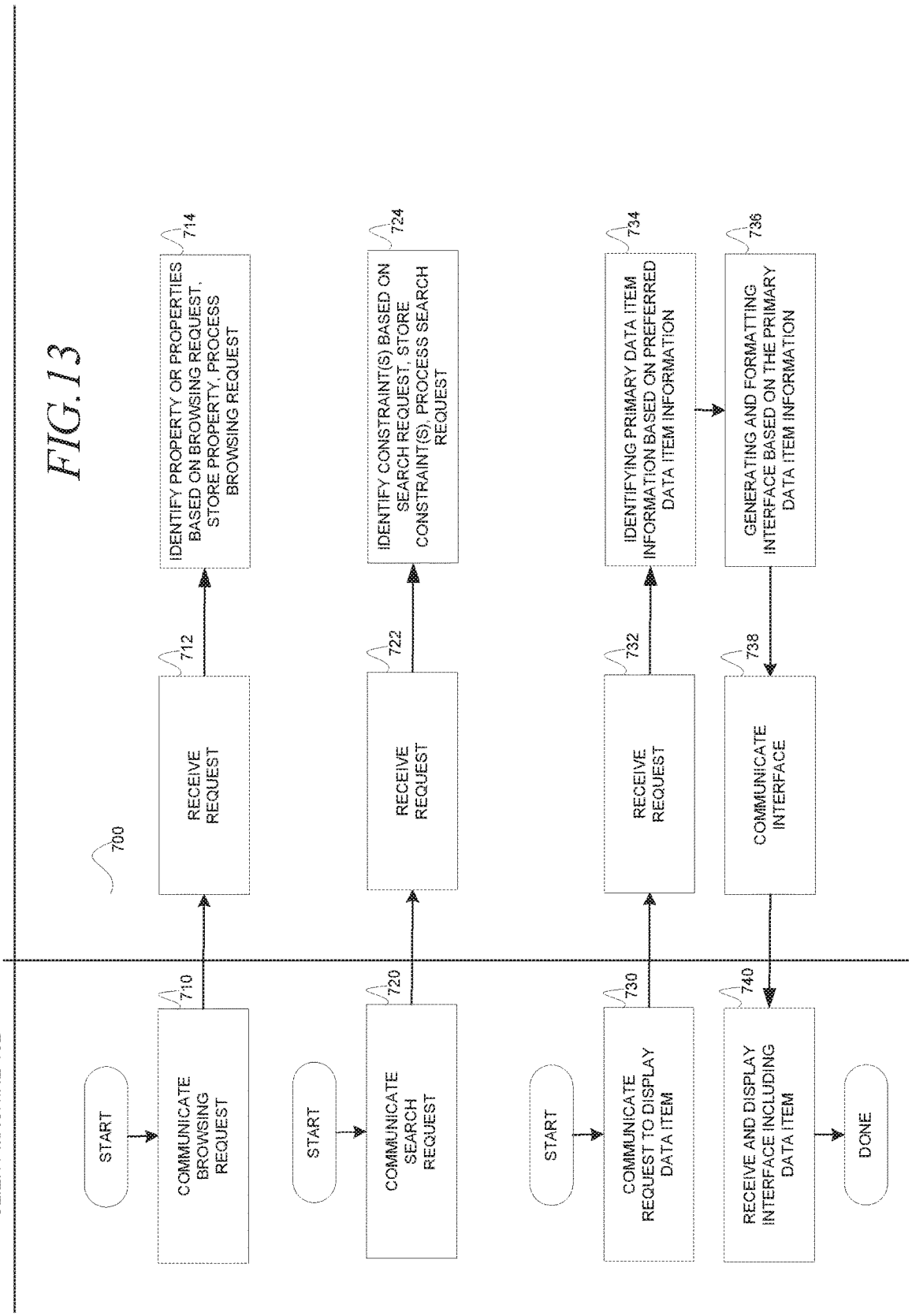
FIG. 13 is a flow chart illustrating a method, according to an embodiment, to reorder the display of information in a data item based on preferred data item information.

FIG. 13 is a flow chart illustrating a method 700, according to an embodiment, to reorder the display of information in a data item 152 based on preferred data item information 656. Illustrated on the left is a client machine 102 and illustrated on the right is a server machine 106. The method 700 may commence at operation 710 with the client machine 102 communicating a browsing request to the server machine 106. The browsing request may include a category (e.g., SPORTS CARS) to identify a category in hierarchy of categories to browse data items, an attribute-value pair (e.g., ("COLOR=RED," "INTERIOR=LEATHER") to identify data items, and the like.

At operation 712, at the server machine 106, request module 652 may receive the request. At operation 714, the handler module 654 may process the request to identify properties 560 based on the browsing request, store the properties 560 as browsing history information 670, and process the browsing request. For example, the handler module 654 may identify the properties 560 "CATEGORY=SPORTS CARS," "COLOR=RED," and "INTERIOR=LEATHER," store the properties 560 in the browsing history information 670 that is associated with the user, and complete the processing of the browsing request.

At operation 720 with the client machine 102 may communicate a search request to the server machine 106. The search request may include a query that includes constraints. For example, the constraints may include keywords (e.g., "Camaro").

At operation 722, at the server machine 106, request module 652 may receive the request. At operation 724, the handler module 654 may process the request to identify constraints 210 based on the search request, store the constraints 210 as searching history information 672, and process the search request. For example, the handler module 654 may identify the keyword constraint "Camaro" store the constraint 210 in the searching history information 672 that is associated with the user, and complete the processing of the search request.

At operation 730, the client machine 102 may communicate a request to display a data item 152. For example, the request may be communicated to a network-based marketplace and the data item 152 may be a listing that describes a Camaro that is being offered for sale on a network-based marketplace.

At operation 732, at the server machine 106, the request module 652 may receive the request to display the data item 152. At operation 734, the handler module 654 may identify primary data item information based on the preferred data item information 656 that is associated with the user. For example, the handler module 654 may compare the information in the data item 152 with the properties 560 that are stored in the browsing history information 670 and register an identification of primary data item information responsive to a match. Also for example, the handler module 654 may compare the information in the data item 152 with the constraints 210 that are stored in the searching history information 672 and register an identification of primary data item information responsive to a match. At operation 736, the handler module 654 may generate and format an interface (e.g., user interface) based on the primary data item information. For example, the handler module 654 may generate and format an user interface (e.g., listing page) based on the data item 152 in the form of a listing for a Camaro where the primary data item information may include "INTERIOR=LEATHER" and "COLOR=RED," as shown in FIG. 14A, and secondary data item information may include "ENGINE=8 CYLINDER" and "PRICE=$20K." At operation 710, the handler module may communicate the interface to the client machine 102.

At operation 712, the client machine 102 may display the user interface including at least the primary data information and not the secondary data item information.

Figure 14A:
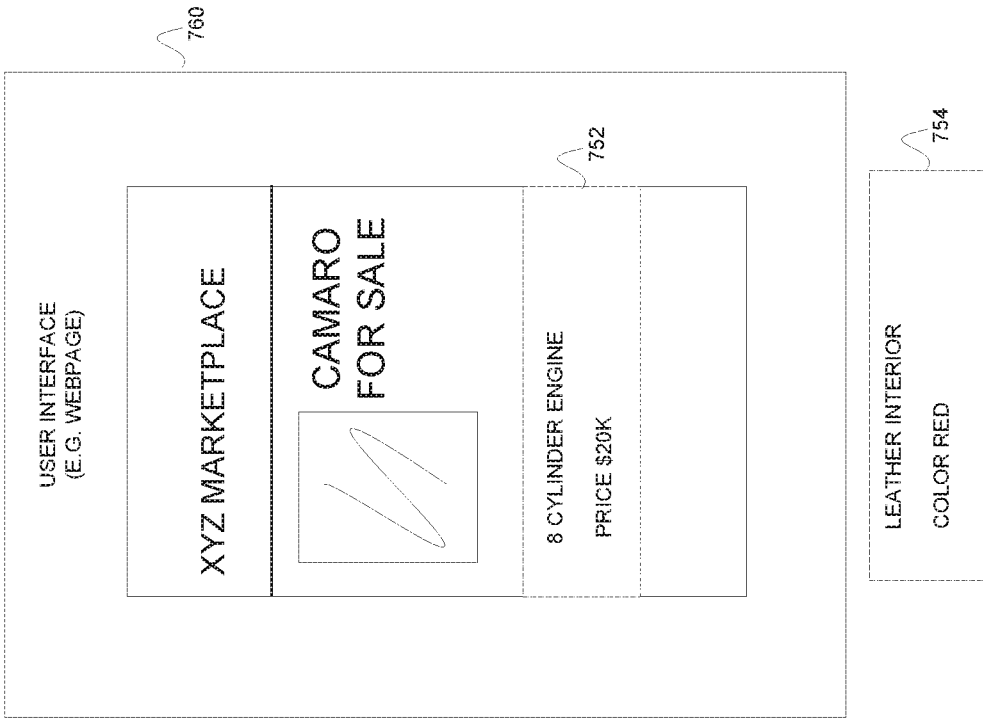
FIG. 14A is a block diagram illustrating a user interface, according to an embodiment.

FIG. 14A is a block diagram illustrating a user interface 750, according to an embodiment, of a listing page that is generated based on preferred data item information 656. The listing page may be generated by the server machine 106 and communicated to the client machine 102 responsive to a request to view a particular data item 152. The data item 152 may include a listing that includes an element 154 with a description for a Camaro that is being offered for sale on a network-based marketplace. The user interface 750 may include primary data item information (e.g., 'LEATHER INTERIOR" and "COLOR") that is retrieved from the element 154 of the data item 152 that includes the description of the Camaro. The primary data item information 752 is immediately displayed. In contrast, the secondary data item information 754 (e.g., '8 CYLINDER ENGINE" and "PRICE $20K") may also be included in the element 154 of the data item 152 that includes the description of the Camaro but it is not immediately displayed. The secondary information may be displayed with a subsequent request of a user (e.g., page-down, scroll-down, etc.).

Figure 14B:
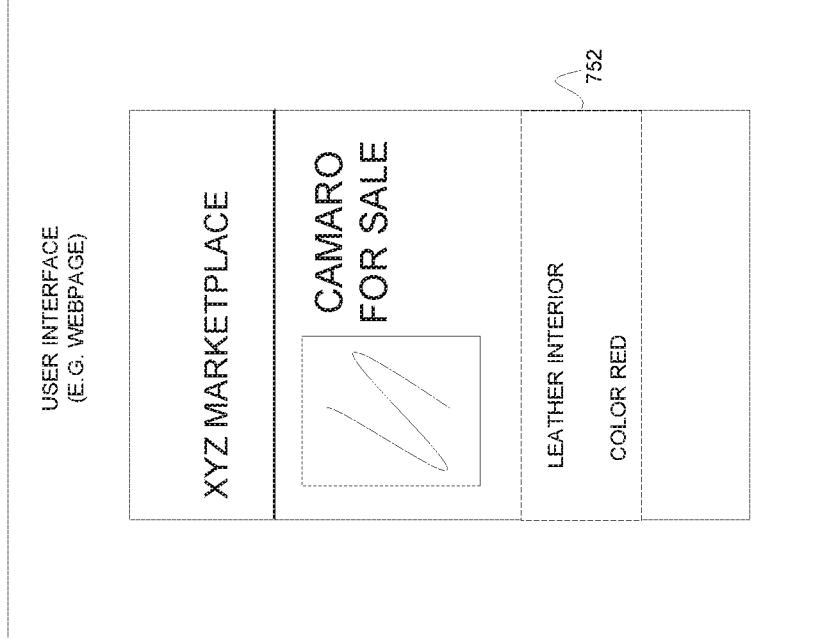
FIG. 14B is a block diagram illustrating a user interface, according to an embodiment.

FIG. 14B is a block diagram illustrating a user interface 760, according to an embodiment, of a listing page that is generated based on preferred data item information 762. The user interface 760 displays the same data item 152 (e.g., listing) as illustrated in user interface 750 in FIG. 14A, however, the browsing history information 670 and searching history information 672 is not the same. Rather, the browsing history information 670 and search history may include user behaviours that indicate an interest in different primary data item information 752 including "8 CYLINDER ENGINE" and "PRICE "$20K." For example, the user may be associated with searching history information 672 that includes the constraints 210 "Camaro 8 cylinder engine price range $15,000.00-$25,000.00." Further for example, a user may be associated with browsing history information 670 that includes properties 560 that describe Camaros with 8 cylinder engines (e.g., ENGINE=8 CYLINDER) and prices in the range from $15,000.00-$25,000.00 (e.g., PRICE RANGE=$15-20K, USD).

In another embodiment, the elements 154 in the data item 152 may be displayed in an order that is determined based on the preferred data item information 656. For example, a data item for a listing on a network-based marketplace may include the elements 154 title, description, price, condition, purchase format (e.g., auction, immediate purchase) that are displayed in the recited order in the absence of the preferred data item information 656. Responsive to the identification of preferred data item information 656, the respective elements 154 may be identified as primary data item information or secondary data item information based on the preferred data item information 656. The primary data item information may be immediately displayed responsive to the request to display the data item 152 and the secondary data item information is displayed responsive to a subsequent request (e.g., page-down, scroll-down, swipe-down).

The term "interface" was described in embodiments that include a user interface 660; however, it will be appreciated by those skilled in the art that the "interface" may also be embodied as a machine interface (e.g., SGML) including machine view components, an audio interface including audio view components, a kinetic interface including kinetic view components, or some other interface.

Network-Based Marketplace

Figure 15:
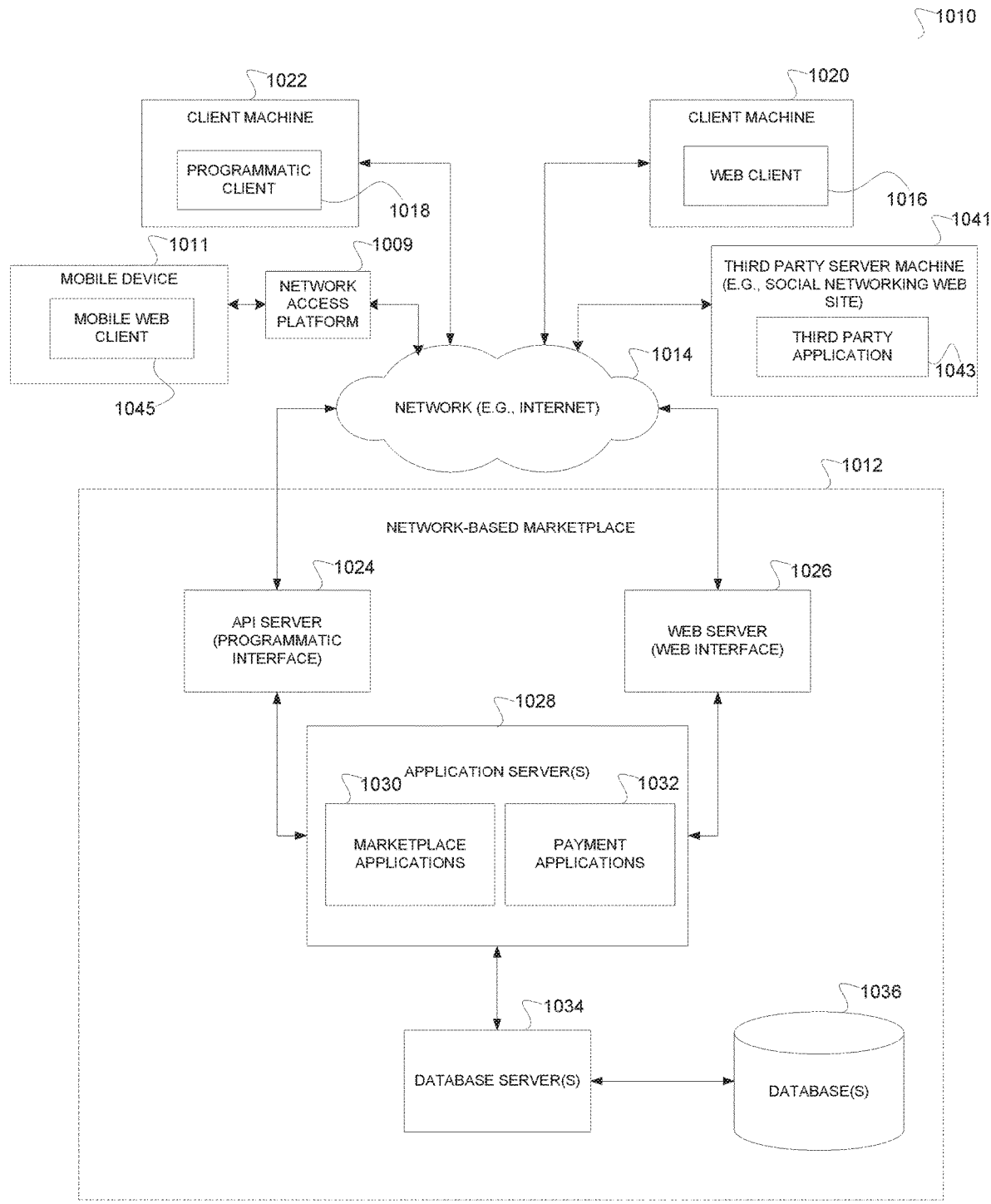
FIG. 15 further illustrates a system, according to an embodiment.

FIG. 15 further illustrates a system 1010, according to an embodiment. The networked system 1010 corresponds to the system 100 in FIG. 1, system 500 in FIG. 8A, or system 650 in FIG. 11, accordingly, the same or similar references have been used to indicate the same or similar features unless otherwise indicated. The networked system 1010 may include a network-based marketplace 1012. The network-based marketplace 1012 provides server-side functionality, via a network 1014 (e.g., the Internet or wide area network (WAN)) to one or more clients. FIG. 15 illustrates, for example, a web client 1016 (e.g., a browser, such as the Internet Explorer browser developed by Microsoft Corporation of Redmond, Wash. State) executing on client machine 1020, a programmatic client 1018 executing on client machine 1022, and a mobile web client 1045 executing on mobile device 1011. For example, the mobile web client 1045 may be embodied as one or more mobile modules that are used to support the Blackberry™ wireless hand held business or smart phone manufactured by Research In Motion of Waterloo, Ontario.

An application program interface (API) server 1024 and a web server 1026 are coupled to, and provide programmatic and web interfaces respectively to, one or more application servers 1028. The application servers 1028 host one or more marketplace applications 1030 and payment applications 1032. The application servers 1028 are, in turn, shown to be coupled to one or more database servers 1034 that facilitate access to one or more databases 1036.

The marketplace applications 1030 may provide a number of marketplace functions and services to users that access the network-based marketplace 1012. The payment applications 1032 may likewise provide a number of payment services and functions to users. The payment applications 1032 may allow users to accumulate value in accounts and then to later redeem the accumulated value for products (e.g., goods or services) that are made available via the marketplace applications 1030. The value may be accumulated in a commercial currency, such as the U.S. dollar, or a proprietary currency, such as "points." While the marketplace applications 1030 and payment applications 1032 are shown in FIG. 15 to both form part of the network-based marketplace 1012, it will be appreciated that, in alternative embodiments, the payment applications 1032 may form part of a payment service that is separate and distinct from the network-based marketplace 1012.

Further, while the networked system 1010 shown in FIG. 15 employs client-server architecture, embodiments of the present disclosure are of course not limited to such an architecture and could equally well find application in a distributed, or peer-to-peer, architecture system, for example. The various marketplace applications 1030 and payment applications 1032 could also be implemented as standalone software programs, which do not necessarily have networking capabilities.

The web client 1016 and mobile web client 1045 access the various marketplace applications 1030 and payment applications 1032 via the web interface supported by the web server 1026. Similarly, the programmatic client 1018 accesses the various services and functions provided by the marketplace applications 1030 and payment applications 1032 via the programmatic interface provided by the API server 1024. The programmatic client 1018 may, for example, be a seller application (e.g., the TurboLister application developed by eBay Inc., of San Jose, Calif.) to enable sellers to author and manage listings on the network-based marketplace 1012 in an off-line manner, and to perform batch-mode communications between the programmatic client 1018 and the network-based marketplace 1012.

FIG. 15 also illustrates a third party application 1043, executing on a third party server machine 1041, as having programmatic access to the networked system 1010 via the programmatic interface provided by the API server 1024. The third party website may communicate user interfaces to the client machines 1022, 1020 or mobile device 1011.

The mobile device 1011 may be embodied as a mobile phone, a personal digital assistant (PDA), a cell phone, or any other wireless device that is capable of communicating with the network-based marketplace 1012. For example, the mobile device 1011 may be embodied as an iPhone mobile phone manufactured by Apple, Inc. of Cupertino, Calif. or, as previously mentioned, a Blackberry™ mobile phone manufactured by Research In Motion of Waterloo, Ontario.

Marketplace and Payment Applications

Figure 16:
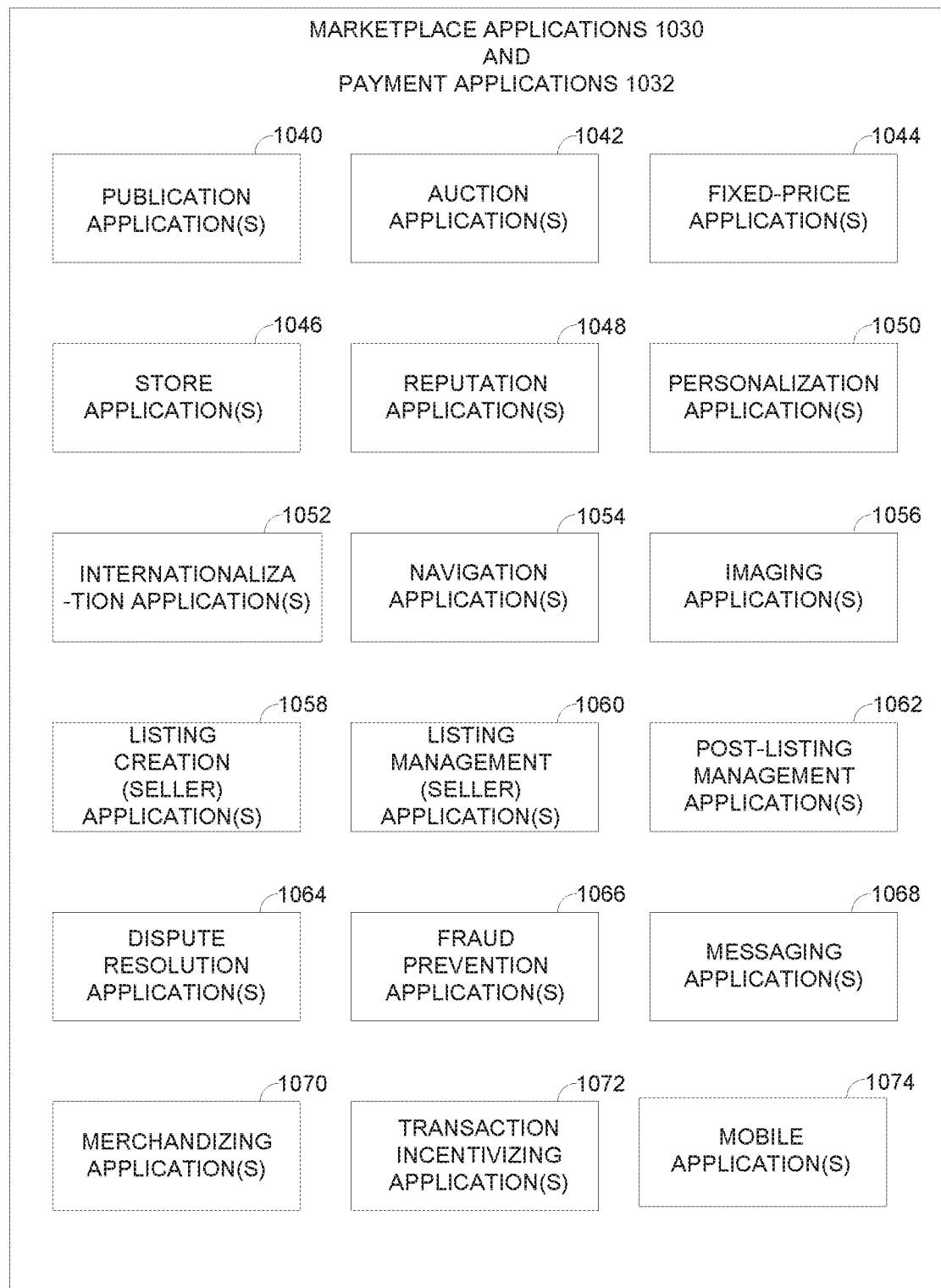
FIG. 16 is a block diagram illustrating marketplace applications and payment applications, according to an embodiment.

FIG. 16 is a block diagram illustrating marketplace applications 1030 and payment applications 1032 that, in one example embodiment, are provided as part of the networked system 1010 of FIG. 15. The marketplace applications 1030 and payment applications 1032 may be hosted on dedicated or shared server machines, as shown on FIG. 15, that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1036 via the database servers 1034, as shown on FIG. 15. The network-based marketplace 1012 of FIG. 15 may provide a number of publishing, listing and price-setting mechanisms whereby a seller may list (or publish information concerning) goods or services for sale; a buyer may indicate a desire to purchase such goods or services; and a price can be set for a transaction pertaining to the goods or services. To this end, the marketplace applications 1030 are shown to include at least one publication application 1040 and one or more auction applications 1042 which support auction-format listing and price setting mechanisms (e.g., English, Dutch, Vickrey, Chinese, Double, Reverse auctions, etc.). The various auction applications 1042 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1044 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed price that is typically higher than the starting price of the auction.

Store application(s) 1046 allows a seller to group listings within a "virtual" store, which may be branded and otherwise personalized by and for the seller. Such a virtual store may also offer promotions, incentives and features that are specific and personalized to a relevant seller.

Reputation applications 1048 allow users that transact, utilizing the network-based marketplace 1012, to establish, build and maintain reputations, which may be made available and published to potential trading partners. Consider that where, for example, the network-based marketplace 1012 supports person-to-person trading, users may otherwise have no history or other reference information whereby the trustworthiness and credibility of potential trading partners may be assessed. The reputation applications 1048 allow a user to establish a reputation within the network-based marketplace 1012 over time, for example, through feedback provided by other transaction partners and by the computation of a feedback score based on the feedback. For example, the feedback score may be publicly displayed by the network-based marketplace 1012. Other potential trading partners may then reference such a feedback score for the purposes of assessing credibility and trustworthiness.

Personalization applications 1050 allow users of the network-based marketplace 1012 to personalize various properties 560 of their interactions with the network-based marketplace 1012. For example, a user may, utilizing an appropriate personalization application 1050, create a personalized reference page at which information regarding transactions to which the user is (or has been) a party may be viewed. Further, a personalization application 1050 may enable a user to personalize listings and other properties 560 of their interactions with the networked system 1010 and other parties.

The networked system 1010 may support a number of marketplaces that are customized, for example, for specific geographic regions. A version of the networked system 1010 may be customized for the United Kingdom, whereas another version of the networked system 1010 may be customized for the United States. Some of these versions may operate as an independent marketplace, or may be customized (or internationalized) presentations of a common underlying marketplace. The networked system 1010 may accordingly include a number of internationalization applications 1052 that customize information (and/or the presentation of information) by the networked system 1010 according to predetermined criteria (e.g., geographic, demographic or marketplace criteria). For example, the internationalization applications 1052 may be used to support the customization of information for a number of regional websites that are operated by the networked system 1010 and that are accessible via respective servers 1024 and 1026 both of FIG. 15.

Navigation of the network-based marketplace 1012 may be facilitated by one or more navigation applications 1054. For example, the network-based marketplace 1012 may receive search information to search for items on the network-based marketplace 1012. A browse application may allow users to browse various category, catalogue, or inventory data structures according to which listings may be classified within the networked system 1010. Various other navigation applications may be provided to supplement the search and browsing applications. For example, the navigation applications 1054 may include the receiving module 110, the processing module 112, the communication module 501 and the saved search module 502, according to an embodiment.

In order to make listings available via the networked system 1010 as visually informing and attractive as possible, the marketplace applications 1030 may include one or more imaging applications 1056 with which users may upload images (e.g., thumbnail images) for inclusion within listings. An imaging application 1056 also operates to incorporate images (e.g., thumbnail images) within viewed listings. The imaging applications 1056 may also support one or more promotional features, such as image galleries that are presented to potential buyers. For example, sellers may pay an additional fee to have an image included within a gallery of images for promoted items.

Listing creation applications 1058 allow sellers to conveniently author listings pertaining to goods or services that they wish to transact via the network-based marketplace 1012, while the listing management applications 1060 allow sellers to manage such listings. Specifically, where a particular seller has authored and/or published a large number of listings, the management of such listings may present a challenge. The listing creation applications 1058 may further facilitate a buyer watching specific listings or specific types of listings. The listing management applications 1060 provide a number of features (e.g., auto-relisting, inventory level monitors, etc.) to assist the seller in managing such listings.

One or more post-listing management applications 1062 may also assist sellers with a number of activities that may typically occur post-listing. For example, upon completion of an auction facilitated by one or more auction applications 1042, a seller may wish to leave feedback regarding a particular buyer. To this end, a post-listing management application 1062 may provide an interface to one or more reputation applications 1048, so as to allow the seller conveniently to provide feedback regarding multiple buyers to the reputation applications 1048.

Dispute resolution applications 1064 provide mechanisms whereby disputes arising between transacting parties may be resolved. For example, the dispute resolution applications 1064 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 1066 implement fraud detection and prevention mechanisms to reduce the occurrence of fraud within the network-based marketplace 1012.

Messaging applications 1068 are responsible for the generation and delivery of messages to users of the network-based marketplace 1012, with such messages, for example, advising users regarding the status of listings at the network-based marketplace 1012 (e.g., providing "outbid" notices to bidders during an auction process or to providing promotional and merchandising information to users). Respective messaging applications 1068 may utilize any one of a number of message delivery networks and platforms to deliver messages to users. For example, messaging applications 1068 may deliver electronic mail (e-mail), instant message (IM), short message service (SMS), text, facsimile, or voice (e.g., voice over IP (VoIP)) messages via the wired (e.g., the Internet), plain old telephone service (POTS), or wireless (e.g., mobile, cellular, WiFi (e.g., IEEE 802.11 technologies including 802.11n, 802.11b, 802.11g, and 802.11a)), worldwide interoperability for microwave access (e.g., WiMAX-IEEE 802.16) networks.

Merchandising applications 1070 support various merchandising functions that are made available to sellers to enable sellers to increase sales via the network-based marketplace 1012. The merchandising applications 1070 also operate the various merchandising features that may be invoked by sellers and may monitor and track the success of merchandising strategies employed by sellers. In addition, the user may utilize the transaction incentivizing applications 1072 to select one or more criterion that may be used to generate a social goodness index that is used to generate a badge. Mobile applications 1074 support mobile devices that access the features and services that are provided by the network-based marketplace 1012.

Data Structures

Figure 17:
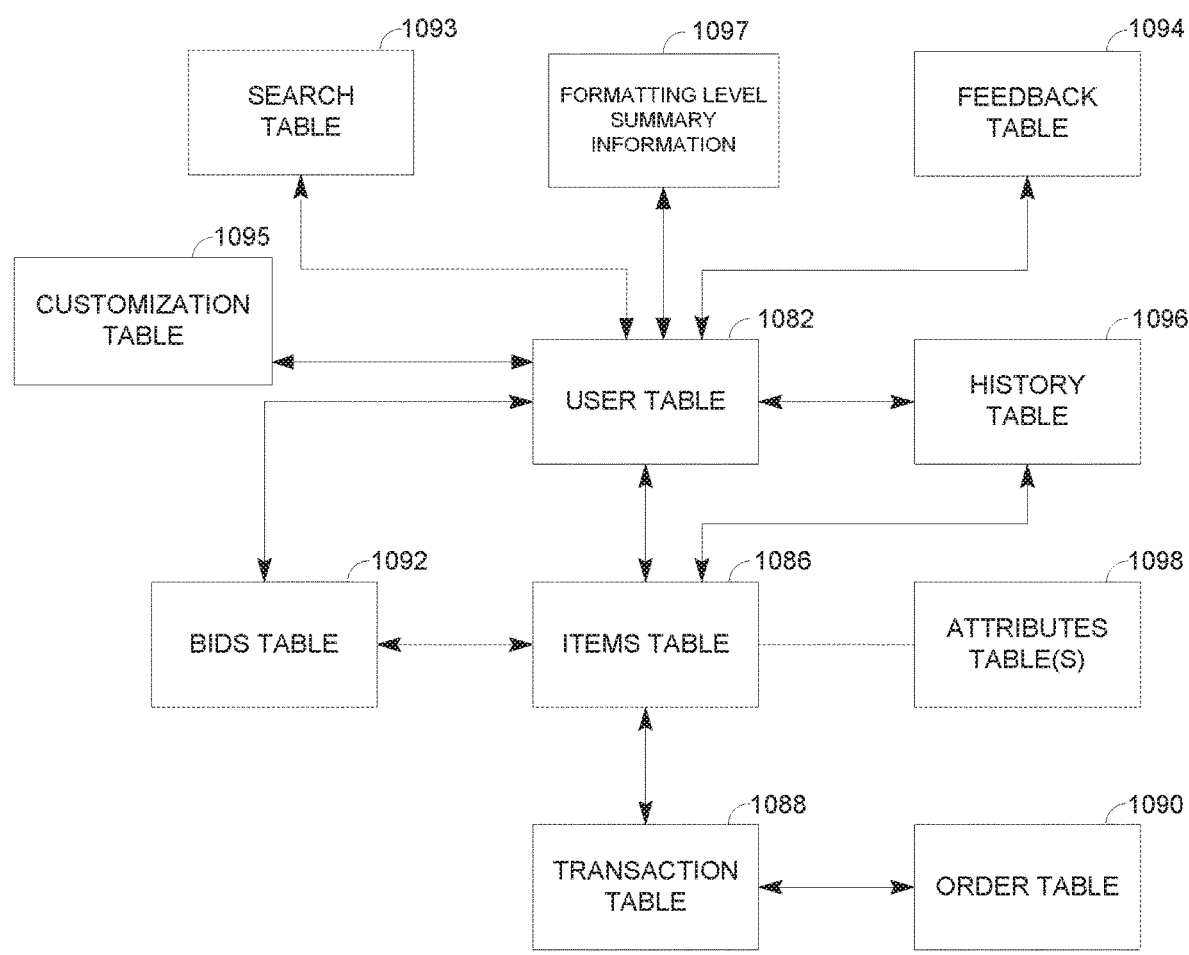
FIG. 17 is a block diagram illustrating a high level entity-relationship diagram, according to an embodiment.

FIG. 17 is a high-level entity-relationship diagram, illustrating various tables 1080 that may be maintained within the databases 1036 of FIG. 15, and that are utilized by and support the marketplace applications 1030 and payment applications 1032 both of FIG. 16. A user table 1082 contains a record for registered users of the network-based marketplace 1012 of FIG. 15. A user may operate as a seller, a buyer, or both, within the network-based marketplace 1012. In one example embodiment, a buyer may be a user that has accumulated value (e.g., commercial or proprietary currency), and is accordingly able to exchange the accumulated value for items that are offered for sale by the network-based marketplace 1012.

The tables 1080 also include an items table 1086 in which item records (e.g., listings) are maintained for goods and services that are available to be, or have been, transacted via the network-based marketplace 1012. Item records (e.g., listings) within the items table 1086 may furthermore be linked to one or more user records within the user table 1082, so as to associate a seller and one or more actual or potential buyers with an item record (e.g., listing).

A transaction table 1088 may contain a record for each transaction (e.g., a purchase or sale transaction or auction) pertaining to items for which records exist within the items table 1086.

An order table 1090 may be populated with order records, with each order record being associated with an order. Each order, in turn, may be associated with one or more transactions for which records exist within the transaction table 1088.

Bid records within a bids table 1092 may relate to a bid received at the network-based marketplace 1012 in connection with an auction-format listing supported by an auction application 1042 of FIG. 16. A feedback table 1094 is utilized by one or more reputation applications 1048 of FIG. 16, in one example embodiment, to construct and maintain reputation information concerning users in the form of a feedback score. A history table 1096 may maintain a history of transactions to which a user has been a party. One or more attributes tables 1098 may record attribute information that pertains to items for which records exist within the items table 1086. Considering only a single example of such an attribute, the attributes tables 1098 may indicate a currency attribute associated with a particular item, with the currency attribute identifying the currency of a price for the relevant item as specified by a seller.

A search table 1093 may store search information that has been entered by a user (e.g., buyer) who is looking for a specific type of listing. A customization table 1095 may store customization information for incentivizing transactions that enhance social goodness.

Formatting level summary information 1097 may facilitate formatting user interfaces 120.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connects the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 1014 (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture Machine-Readable Medium

Figure 18:
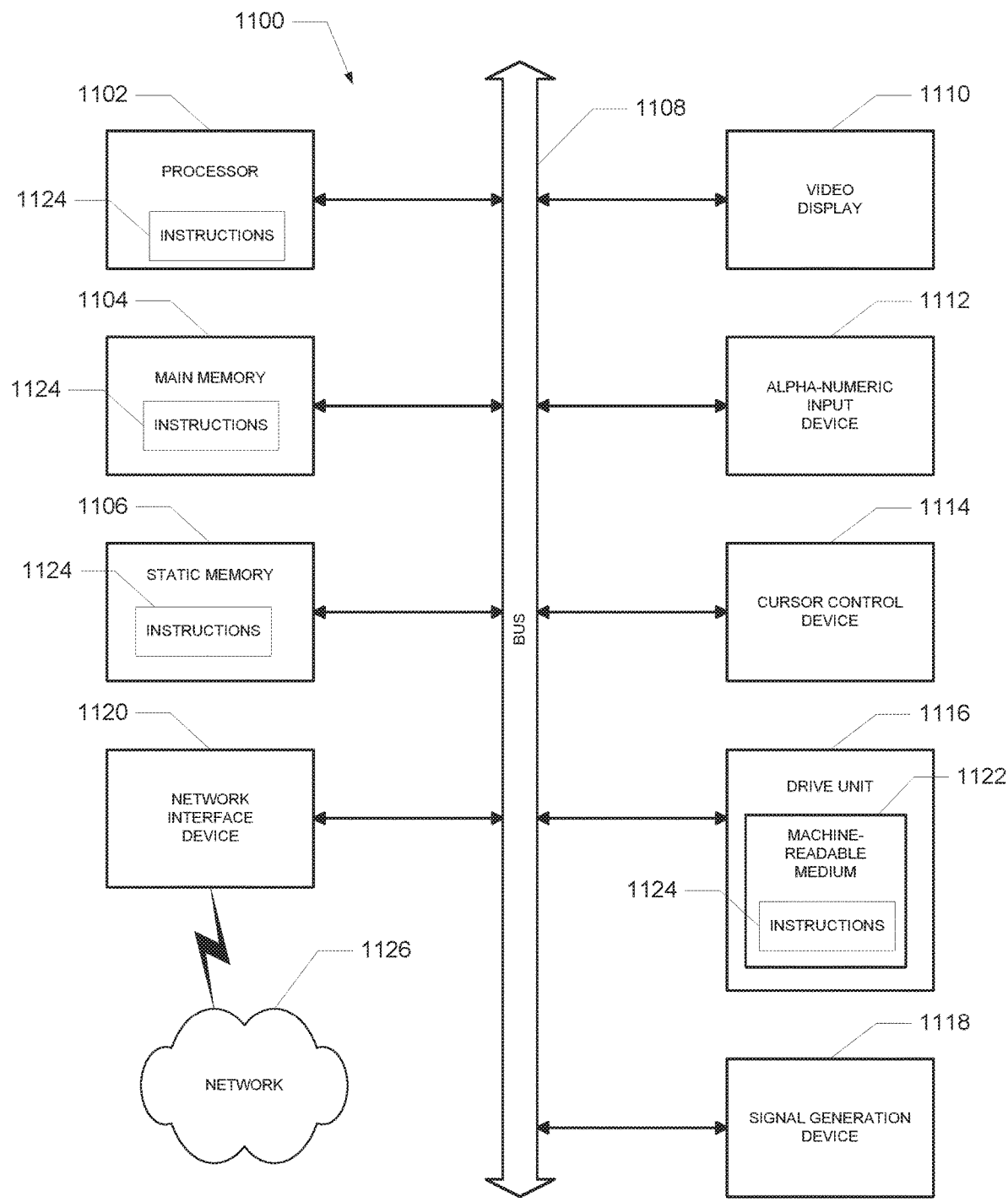
FIG. 18 shows a diagrammatic representation of a machine in the form of a computer system within which may be executed a set of instructions for causing the machine to perform any one or more of the methodologies discussed herein, according to an example embodiment.

FIG. 18 is a block diagram of a machine within which instructions may be executed for causing the machine to perform any one or more of the methodologies discussed herein. In one example embodiment, the machine may be the client machines 102, 1022, 1020, 1041 or any other machine identified in the present application. In one example embodiment, the machine may be the mobile device 1011 or any other device identified in the present application. In one example embodiment, the machine may be the server machines 106, 1024, 1026, 1028, 1034 or any of the other servers identified in the present application. In alternative embodiments, the machine operates as a standalone device or may be connected (e.g., networked) to other machines. In a networked deployment, the machine may operate in the capacity of a server or a client machine 102 in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium

The drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media 1122. Instructions may also reside within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures 1024. The term "machine-readable medium" shall also be taken to include any tangible medium that is capable of storing, encoding or carrying instructions 1024 for execution by the machine and that cause the machine to perform any one or more of the methodologies of the present disclosure, or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analogue communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to adapt search results were disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A system comprising:
   at least one processor and executable instructions accessible on a computer-readable medium that, when executed, cause the at least one processor to perform operations comprising:
   receiving, from a client device, an interaction with a set of search results comprising a plurality of data items, each data item comprising a plurality of elements;
   identifying a first formatting level of the set of search results;
   identifying user interaction information comprising an optimal formatting level and an optimal formatting level threshold, the optimal formatting level identifying a formatting level associated with a most number of purchases for a user and the optimal formatting level threshold identifying whether to advance over intervening formatting levels to the optimal formatting level;
   based on the interaction and the optimal formatting level threshold being exceeded, transitioning one or more data items in the set of search results from the first formatting level to a second formatting level, wherein the second formatting level skips intervening formatting levels between the first formatting level and the second formatting level in an hierarchy of formatting levels, each level in the hierarchy of formatting levels containing fewer data items but more elements per data item than the previous level; and
   communicating the second set of search results comprising the one or more data items in the second formatting level to the client device.

2. The system of claim 1, wherein the second formatting level skips intervening formatting levels between the first formatting level and the second formatting level in an hierarchy of formatting levels.

3. The system of claim 1, wherein the first formatting level defines a number of elements per data item and a number of data items per set of search results.

4. The system of claim 3, wherein the second set of search results in the second formatting level has a different number of data items and a different number of elements per data item than the set of search results in the first formatting level.

5. The system of claim 1, wherein the identifying the first formatting level of the set of search results is based on a level score corresponding to previous interactions with the set of search results.

6. The system of claim 5, wherein the interaction causes the level score to meet a transition threshold indicating a change in a mindset of a user.

7. The system of claim 1, wherein the interaction is selected from a group of interactions that includes a scroll of a user interface down to display additional data items of the plurality of data items or a scroll of the user interface up to display additional data items of the plurality of data items.

8. The system of claim 1, wherein the interaction is selected from a group of interactions including a removal of a keyword from at least one constraint of a search query or a removal of a category from the at least one constraint of the search query.

9. The system of claim 1, wherein the interaction is selected from a group of interactions that includes an addition of a keyword to at least one constraint of a search query or a removal of a keyword from the at least one constraint.

10. The system of claim 1, wherein the first formatting level is associated with definition information including a first size of a first area that is predetermined and first element descriptor information including a first text point size for formatting text and a first image scaling factor for scaling an image.

11. The system of claim 10, wherein the second formatting level is associated with definition information including a second size of a second area that is predetermined and a second element descriptor information including a text point size for formatting text and a second image scaling factor for scaling an image, wherein the first text point size associated with the first formatting level is less than the second text point size associated with the second formatting level, and wherein the first image scaling factor associated with the first formatting level is less than the second image scaling factor associated with the second formatting level.

12. A method comprising:
receiving, from a client device, an interaction with a set of search results comprising a plurality of data items, each data item comprising a plurality of elements;
identifying a first formatting level of the set of search results;
identifying user interaction information comprising an optimal formatting level and an optimal formatting level threshold, the optimal formatting level identifying a formatting level associated with a most number of purchases for a user and the optimal formatting level threshold identifying whether to advance over intervening formatting levels to the optimal formatting level;
based on the interaction and the optimal formatting level threshold being exceeded, transitioning one or more data items in the set of search results from the first formatting level to a second formatting level, wherein the second formatting level skips intervening formatting levels between the first formatting level and the second formatting level in an hierarchy of formatting levels, each level in the hierarchy of formatting levels containing fewer data items but more elements per data item than the previous level; and
communicating the second set of search results comprising the one or more data items in the second formatting level to the client device.

13. The method of claim 12, wherein the first formatting level defines a number of elements per data item and a number of data items per set of search results.

14. The method of claim 12, wherein the second set of search results in the second formatting level has a different number of data items and a different number of elements per data item than the set of search results in the first formatting level.

15. The method of claim 12, wherein the identifying the first formatting level of the set of search results is based on a level score corresponding to previous interactions with the set of search results.

16. The method of claim 15, wherein the interaction causes the level score to meet a transition threshold indicating a change in a mindset of a user.

17. The method of claim 12, wherein the interaction is selected from a group of interactions that includes a scroll of a user interface down to display additional data items of the plurality of data items, a scroll of the user interface up to display additional data items of the plurality of data items, a removal of a keyword from at least one constraint of a search query, a removal of a category from the at least one constraint of the search query, an addition of a keyword to at least one constraint of a search query, or a removal of a keyword from the at least one constraint.

18. A machine-readable medium having no transitory signal and storing instructions that, when executed by a machine, cause the machine to execute actions comprising:
receiving, from a client device, an interaction with a set of search results comprising a plurality of data items, each data item comprising a plurality of elements;
identifying a first formatting level of the set of search results based on previous interactions with the set of search results;
identifying user interaction information comprising an optimal formatting level and an optimal formatting level threshold, the optimal formatting level identifying a formatting level associated with a most number of purchases for a user and the optimal formatting level threshold identifying whether to advance over intervening formatting levels to the optimal formatting level;
based on the interaction and the optimal formatting level threshold being exceeded, transitioning one or more data items in the set of search results from the first formatting level to a second formatting level, wherein the second formatting level skips intervening formatting levels between the first formatting level and the second formatting level in an hierarchy of formatting levels, each level in the hierarchy of formatting levels containing fewer data items but more elements per data item than the previous level; and
communicating the second set of search results comprising the one or more data items in the second formatting level to the client device.

19. The machine-readable medium of claim 18, wherein the first formatting level defines a number of elements per data item and a number of data items per set of search results.

20. The machine-readable medium of claim 19, wherein the second set of search results in the second formatting level has a different number of data items and a different number of elements per data item than the set of search results in the first formatting level.

* * * * *